US010752534B2

(12) United States Patent
Nieber et al.

(10) Patent No.: US 10,752,534 B2
(45) Date of Patent: Aug. 25, 2020

(54) APPARATUSES AND METHODS FOR LASER PROCESSING LAMINATE WORKPIECE STACKS

(71) Applicant: Corning Incorporated, Corning, NY (US)

(72) Inventors: Albert Roth Nieber, Painted Post, NY (US); Kristopher Allen Wieland, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 186 days.

(21) Appl. No.: 15/795,870

(22) Filed: Oct. 27, 2017

(65) Prior Publication Data

US 2018/0118603 A1 May 3, 2018

Related U.S. Application Data

(60) Provisional application No. 62/444,926, filed on Jan. 11, 2017, provisional application No. 62/415,794, filed on Nov. 1, 2016.

(51) Int. Cl.
*B23K 26/53* (2014.01)
*B23K 26/57* (2014.01)
(Continued)

(52) U.S. Cl.
CPC ........ *C03B 33/078* (2013.01); *B23K 26/0006* (2013.01); *B23K 26/0622* (2015.10);
(Continued)

(58) Field of Classification Search
CPC .. B23K 26/53; B23K 26/57; B32B 17/10036; C03B 33/078; C03B 33/076
See application file for complete search history.

(56) References Cited

U.S. PATENT DOCUMENTS 1,790,397 A    1/1931   Woods et al.
2,682,134 A    6/1954   Stookey
(Continued)

FOREIGN PATENT DOCUMENTS

CN    2388062 Y    7/2000
CN    1283409 C    11/2006
(Continued)

OTHER PUBLICATIONS

McGloin et al."Bessel beams: diffraction in a new light" Contemporary Physics, vol. 46 No. 1 (2005) pp. 15-28.
(Continued)

*Primary Examiner* — Mark A Osele
*Assistant Examiner* — Christopher C Caillouet
(74) *Attorney, Agent, or Firm* — Smit Kapadia

(57) ABSTRACT

A method for laser processing a laminate workpiece stack includes forming a contour line in a first transparent workpiece of the laminate workpiece stack having a resin layer disposed between the first transparent workpiece and a second transparent workpiece. Forming the contour line includes focusing a pulsed laser beam into a pulsed laser beam focal line directed into the first transparent workpiece to generate an induced absorption within the first transparent workpiece and translating the pulsed laser beam focal line along a first workpiece separation line, thereby laser forming the contour line having a plurality of defects. The method also includes separating the resin layer along a resin separation line by focusing the pulsed laser beam into the pulsed laser beam focal line directed into the resin layer and translating the pulsed laser beam focal line along the resin separation line, thereby laser ablating the resin layer.

36 Claims, 16 Drawing Sheets

(51) Int. Cl.

| | | |
|---|---|---|
| *C03B 33/07* | (2006.01) | |
| *B32B 17/10* | (2006.01) | |
| *B23K 26/08* | (2014.01) | |
| *B23K 26/55* | (2014.01) | |
| *B23K 26/0622* | (2014.01) | |
| *B23K 26/00* | (2014.01) | |
| *B23K 26/073* | (2006.01) | |
| *B23K 26/70* | (2014.01) | |
| *B23K 26/38* | (2014.01) | |
| *B23K 26/402* | (2014.01) | |
| *C03B 33/02* | (2006.01) | |
| *C03B 33/04* | (2006.01) | |
| *B23K 101/18* | (2006.01) | |
| *B23K 101/00* | (2006.01) | |
| *B23K 103/00* | (2006.01) | |
| *B23K 103/18* | (2006.01) | |
| *B23K 103/16* | (2006.01) | |

(52) U.S. Cl.
CPC ...... *B23K 26/0624* (2015.10); *B23K 26/0738* (2013.01); *B23K 26/08* (2013.01); *B23K 26/0869* (2013.01); *B23K 26/38* (2013.01); *B23K 26/402* (2013.01); *B23K 26/53* (2015.10); *B23K 26/55* (2015.10); *B23K 26/57* (2015.10); *B23K 26/702* (2015.10); *B32B 17/10036* (2013.01); *B32B 17/1099* (2013.01); *B32B 17/10761* (2013.01); *B32B 17/10788* (2013.01); *C03B 33/0222* (2013.01); *C03B 33/04* (2013.01); *C03B 33/076* (2013.01); *B23K 2101/006* (2018.08); *B23K 2101/18* (2018.08); *B23K 2103/172* (2018.08); *B23K 2103/18* (2018.08); *B23K 2103/54* (2018.08); *B32B 2605/006* (2013.01)

(56) References Cited

U.S. PATENT DOCUMENTS

| | | | |
|---|---|---|---|
| 2,749,794 | A | 6/1956 | O'Leary |
| 3,647,410 | A | 3/1972 | Heaton et al. |
| 3,695,497 | A | 10/1972 | Dear |
| 3,695,498 | A | 10/1972 | Dear |
| 3,729,302 | A | 4/1973 | Heaton |
| 3,775,084 | A | 11/1973 | Heaton |
| 4,226,607 | A | 10/1980 | Domken |
| 4,441,008 | A | 4/1984 | Chan |
| 4,546,231 | A | 10/1985 | Gresser et al. |
| 4,646,308 | A | 2/1987 | Kafka et al. |
| 4,764,930 | A | 8/1988 | Bille et al. |
| 4,891,054 | A | 1/1990 | Bricker et al. |
| 4,907,586 | A | 3/1990 | Bille et al. |
| 4,918,751 | A | 4/1990 | Pessot et al. |
| 4,929,065 | A | 5/1990 | Hagerty et al. |
| 5,035,918 | A | 7/1991 | Vyas |
| 5,040,182 | A | 8/1991 | Spinelli et al. |
| 5,104,210 | A | 4/1992 | Tokas |
| 5,108,857 | A | 4/1992 | Kitayama et al. |
| 5,112,722 | A | 5/1992 | Tsujino et al. |
| 5,114,834 | A | 5/1992 | Nachshon |
| 5,265,107 | A | 11/1993 | Delfyett |
| 5,400,350 | A | 3/1995 | Galvanauskas et al. |
| 5,434,875 | A | 7/1995 | Rieger et al. |
| 5,436,925 | A | 7/1995 | Lin et al. |
| 5,553,093 | A | 9/1996 | Ramaswamy et al. |
| 5,574,597 | A | 11/1996 | Kataoka et al. |
| 5,586,138 | A | 12/1996 | Yokayama |
| 5,656,186 | A | 8/1997 | Mourou et al. |
| 5,676,866 | A | 10/1997 | In Den Baumen et al. |
| 5,684,642 | A | 11/1997 | Zumoto et al. |
| 5,696,782 | A | 12/1997 | Harter et al. |
| 5,736,709 | A | 4/1998 | Neiheisel |
| 5,776,220 | A | 7/1998 | Allaire et al. |
| 6,016,223 | A | 1/2000 | Suzuki et al. |
| 6,033,583 | A | 3/2000 | Musket et al. |
| 6,038,055 | A | 3/2000 | Hansch et al. |
| 6,055,829 | A | 5/2000 | Witzmann et al. |
| 6,078,599 | A | 6/2000 | Everage et al. |
| 6,156,030 | A | 12/2000 | Neev |
| 6,160,835 | A | 12/2000 | Kwon |
| 6,186,384 | B1 | 2/2001 | Sawada |
| 6,210,401 | B1 | 4/2001 | Lai |
| 6,256,328 | B1 | 7/2001 | Delfyett et al. |
| 6,259,151 | B1 | 7/2001 | Morrison |
| 6,259,512 | B1 | 7/2001 | Mizouchi |
| 6,272,156 | B1 | 8/2001 | Reed et al. |
| 6,301,932 | B1 | 10/2001 | Allen et al. |
| 6,322,958 | B1 | 11/2001 | Hayashi |
| 6,339,208 | B1 | 1/2002 | Rockstroh et al. |
| 6,373,565 | B1 | 4/2002 | Kafka et al. |
| 6,381,391 | B1 | 4/2002 | Islam et al. |
| 6,396,856 | B1 | 5/2002 | Sucha et al. |
| 6,407,360 | B1 | 6/2002 | Choo et al. |
| 6,438,996 | B1 | 8/2002 | Cuvelier |
| 6,445,491 | B2 | 9/2002 | Sucha et al. |
| 6,449,301 | B1 | 9/2002 | Wu et al. |
| 6,484,052 | B1 | 11/2002 | Visuri et al. |
| 6,489,589 | B1 | 12/2002 | Alexander |
| 6,501,578 | B1 | 12/2002 | Bernstein et al. |
| 6,552,301 | B2 | 4/2003 | Herman et al. |
| 6,573,026 | B1 | 6/2003 | Aitken et al. |
| 6,592,703 | B1 | 7/2003 | Habeck et al. |
| 6,635,849 | B1 | 10/2003 | Okawa et al. |
| 6,635,850 | B2 | 10/2003 | Amako et al. |
| 6,720,519 | B2 | 4/2004 | Liu et al. |
| 6,729,161 | B1 | 5/2004 | Miura et al. |
| 6,744,009 | B1 | 6/2004 | Xuan et al. |
| 6,787,732 | B1 | 9/2004 | Xuan et al. |
| 6,800,237 | B1 | 10/2004 | Yamamoto et al. |
| 6,800,831 | B1 | 10/2004 | Hoetzel |
| 6,958,094 | B2 | 10/2005 | Ohmi et al. |
| 6,992,026 | B2 | 1/2006 | Fukuyo et al. |
| 7,009,138 | B2 | 3/2006 | Amako et al. |
| 7,061,583 | B2 | 6/2006 | Mulkens et al. |
| 7,353,829 | B1 | 4/2008 | Wachter et al. |
| 7,402,773 | B2 | 7/2008 | Nomaru |
| 7,511,886 | B2 | 3/2009 | Schultz et al. |
| 7,535,634 | B1 | 5/2009 | Savchenkov et al. |
| 7,633,033 | B2 | 12/2009 | Thomas et al. |
| 7,642,483 | B2 | 1/2010 | You et al. |
| 7,649,153 | B2 | 1/2010 | Haight et al. |
| 7,726,532 | B2 | 6/2010 | Gonoe |
| 8,104,385 | B2 | 1/2012 | Hayashi et al. |
| 8,118,971 | B2 | 2/2012 | Hori et al. |
| 8,132,427 | B2 | 3/2012 | Brown et al. |
| 8,168,514 | B2 | 5/2012 | Garner et al. |
| 8,245,539 | B2 | 8/2012 | Lu et al. |
| 8,245,540 | B2 | 8/2012 | Abramov et al. |
| 8,269,138 | B2 | 9/2012 | Garner et al. |
| 8,283,595 | B2 | 10/2012 | Fukuyo et al. |
| 8,292,141 | B2 | 10/2012 | Cox et al. |
| 8,296,066 | B2 | 10/2012 | Zhao et al. |
| 8,327,666 | B2 | 12/2012 | Harvey et al. |
| 8,341,976 | B2 | 1/2013 | Dejneka et al. |
| 8,347,651 | B2 | 1/2013 | Abramov et al. |
| 8,358,888 | B2 | 1/2013 | Ramachandran |
| 8,444,906 | B2 | 5/2013 | Lee et al. |
| 8,448,471 | B2 | 5/2013 | Kumatani et al. |
| 8,518,280 | B2 | 8/2013 | Hsu et al. |
| 8,549,881 | B2 | 10/2013 | Brown et al. |
| 8,584,354 | B2 | 11/2013 | Cornejo et al. |
| 8,584,490 | B2 | 11/2013 | Garner et al. |
| 8,592,716 | B2 | 11/2013 | Abramov et al. |
| 8,604,380 | B2 | 12/2013 | Howerton et al. |
| 8,607,590 | B2 | 12/2013 | Glaesemann et al. |
| 8,616,024 | B2 | 12/2013 | Cornejo et al. |
| 8,635,887 | B2 | 1/2014 | Black et al. |
| 8,680,489 | B2 | 3/2014 | Martinez et al. |
| 8,685,838 | B2 | 4/2014 | Fukuyo et al. |
| 8,697,228 | B2 | 4/2014 | Carre et al. |
| 8,720,228 | B2 | 5/2014 | Li |
| 8,826,696 | B2 | 9/2014 | Brown et al. |

(56) References Cited

U.S. PATENT DOCUMENTS

| | | |
|---|---|---|
| 8,852,698 B2 | 10/2014 | Fukumitsu |
| 8,887,529 B2 | 11/2014 | Lu et al. |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0021615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Glukstad |
| 2006/0266744 A1 | 11/2006 | Nomaru |
| 2006/0289410 A1 | 12/2006 | Morita et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2008/0318028 A1* | 12/2008 | Winstanley ....... B32B 17/10036 428/332 |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandstrom et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0205356 A1 | 8/2012 | Pluss |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0216573 A1 | 5/2013 | Hosseini et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |

(56) References Cited

U.S. PATENT DOCUMENTS

| | | |
|---|---|---|
| 2014/0361463 A1 | 12/2014 | Desimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1* | 6/2015 | Manley .............. B32B 17/00 428/34 |
| 2015/0166391 A1 | 6/2015 | Marjanovic et al. |
| 2015/0166393 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0367442 A1 | 12/2015 | Bovatsek et al. |
| 2016/0008927 A1 | 1/2016 | Grundmueller et al. |
| 2016/0009066 A1 | 1/2016 | Neiber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0279895 A1 | 9/2016 | Marjanovic et al. |
| 2016/0280580 A1 | 9/2016 | Bohme |
| 2016/0290791 A1 | 10/2016 | Buono et al. |
| 2017/0002601 A1 | 1/2017 | Bergh et al. |
| 2017/0052381 A1 | 2/2017 | Huang et al. |
| 2017/0169847 A1 | 6/2017 | Tamaki |
| 2017/0368638 A1 | 12/2017 | Tayebati et al. |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102248302 A | 11/2011 |
| CN | 102343631 A | 2/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 10346027 A | 4/2014 |
| CN | 203509350 U | 4/2014 |
| CN | 104344202 A | 2/2015 |
| DE | 2231330 A1 | 1/1974 |
| DE | 10200635555 A1 | 1/2008 |
| DE | 102012010635 A1 | 11/2013 |
| DE | 102013223637 A1 | 5/2015 |
| EP | 0270897 A1 | 6/1988 |
| EP | 0609978 A1 | 8/1994 |
| EP | 1159104 B1 | 8/2004 |
| EP | 2202545 A1 | 6/2010 |
| EP | 2783784 A2 | 10/2014 |
| FR | 298294 A1 | 10/2013 |
| GB | 1242172 | 8/1971 |
| JP | 1179770 A | 7/1989 |
| JP | 6318756 A | 11/1994 |
| JP | 09106243 A | 4/1997 |
| JP | 11269683 A | 10/1999 |
| JP | 11347758 A | 12/1999 |
| JP | 2001138083 A | 5/2001 |
| JP | 2002228818 A | 8/2002 |
| JP | 2003062756 A | 3/2003 |
| JP | 2003114400 A | 4/2003 |
| JP | 2003154517 A | 5/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 2006130691 A | 5/2006 |
| JP | 2006248885 A | 9/2006 |
| JP | 2007021548 A | 2/2007 |
| JP | 2007253203 A | 10/2007 |
| JP | 2009056482 A | 3/2009 |
| JP | 2009172633 A | 8/2009 |
| JP | 2010017990 A | 1/2010 |
| JP | 2010046761 A | 3/2010 |
| JP | 04592855 B2 | 12/2010 |
| JP | 2011049398 A | 3/2011 |
| JP | 04672689 B2 | 4/2011 |
| JP | 04880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 05274085 B2 | 8/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2009057161 A | 6/2009 |
| KR | 1020621 B1 | 3/2011 |
| KR | 2012015366 A | 2/2012 |
| KR | 2012074508 A | 7/2012 |
| KR | 2013031380 A | 3/2013 |
| KR | 1269474 B1 | 5/2013 |
| KR | 2013124646 A | 11/2013 |
| KR | 1344368 B1 | 12/2013 |
| KR | 2014022980 A | 2/2014 |
| KR | 2014022981 A | 2/2014 |
| KR | 1020140064220 A | 5/2014 |
| TW | 201139025 A | 11/2011 |
| TW | 201226345 A | 7/2012 |
| WO | 1999029243 A1 | 6/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2011056781 A1 | 5/2011 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014064492 A1 | 5/2014 |
| WO | 2014079478 A1 | 5/2014 |

(56) References Cited

FOREIGN PATENT DOCUMENTS

| WO | 2014079570 A1 | 5/2014 |
|---|---|---|
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. of SPIE vol. 8967 896711-1 (2014).
Wang et al, "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.

Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Kerr. "Filamentary tracks formed in transparent optical glass by laser beam self-focusing. II. Theoretical Analysis" Physical Review A. 4(3) 1971, pp. 1196-1218.
"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.

(56) References Cited

OTHER PUBLICATIONS

Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with Muse durations between 20 fs and ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], 5883-5886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).

* cited by examiner

APPARATUSES AND METHODS FOR LASER PROCESSING LAMINATE WORKPIECE STACKS

This application claims the benefit of priority under 35 U.S.C. § 119 of U.S. Provisional Application Ser. Nos. 62/415,794, filed on Nov. 1, 2016 and 62/444,926, filed on Jan. 11, 2017, the contents of each are relied upon and incorporated herein by reference in their entirety.

BACKGROUND

Field

The present specification generally relates to apparatuses and methods for laser processing transparent workpieces, and more particularly, to laser separating laminate workpiece stacks comprising multiple transparent workpieces.

Technical Background

The area of laser processing of materials encompasses a wide variety of applications that involve cutting, drilling, milling, welding, melting, etc. of different types of materials. Among these processes, one that is of particular interest is cutting or separating layered stacks including glass substrates and resin for vehicle windows, such as vehicle windshields.

From process development, cost perspectives, and production quality there are many opportunities for improvement in cutting and separating glass substrates and layered stacks of resin and glass substrates. It is of great interest to have a faster, cleaner, cheaper, more repeatable, more accurate, and more reliable method of separating layered stacks of resin and glass substrates than what is currently practiced in the market. Accordingly, a need exists for alternative improved methods for separating layered stacks of resin and glass substrates.

SUMMARY

According to one embodiment, a method for laser processing a laminate workpiece stack includes forming a contour line in a first transparent workpiece of a laminate workpiece stack having a resin layer disposed between the first transparent workpiece and a second transparent workpiece. Forming the contour line includes focusing a pulsed laser beam output by a beam source into a pulsed laser beam focal line oriented along a beam pathway and directed into the first transparent workpiece, the pulsed laser beam focal line generating an induced absorption within the first transparent workpiece and translating the laminate workpiece stack and the pulsed laser beam focal line relative to each other along a first workpiece separation line, thereby laser forming the contour line having a plurality of defects along the first workpiece separation line. The method also includes separating the resin layer along a resin separation line. Separating the resin layer includes focusing the pulsed laser beam into the pulsed laser beam focal line oriented along the beam pathway and directed into the resin layer and translating the laminate workpiece stack and the pulsed laser beam focal line relative to each other along the resin separation line, thereby laser ablating the resin layer along the resin separation line.

In another embodiment, a method of laser processing a laminate workpiece stack includes laminating a resin layer between a first transparent workpiece and a second transparent workpiece to form a laminate workpiece stack, where the first transparent workpiece is a strengthened glass substrate, positioning the laminate workpiece stack such that the first transparent workpiece is located downstream the second transparent workpiece along a beam pathway, and forming a contour line in the first transparent workpiece along a first workpiece separation line. Forming the contour line includes focusing a pulsed laser beam output by a beam source into a pulsed laser beam focal line oriented along the beam pathway and directed into the first transparent workpiece, the pulsed laser beam focal line generating an induced absorption within the first transparent workpiece, the induced absorption producing a defect along the pulsed laser beam focal line within the first transparent workpiece and translating the laminate workpiece stack and the beam pathway relative to each other along the first workpiece separation line, thereby laser forming the contour line having a plurality of defects along the first workpiece separation line and inducing crack propagation along the contour line to separate the first transparent workpiece along the first workpiece separation line. The method also includes separating the resin layer along a resin separation line. Separating the resin layer includes focusing the pulsed laser beam focal line oriented along the beam pathway into the resin layer of the laminate workpiece stack and translating the laminate workpiece stack and the pulsed laser beam focal line relative to each other along the resin separation line, thereby ablating the resin layer along the resin separation line.

In yet another embodiment, a method for laser processing a laminate workpiece stack includes laminating a resin layer between a first transparent workpiece and a second transparent workpiece to form a laminate workpiece stack, where the first transparent workpiece and the second transparent workpiece are each arcuate, and forming a contour line in the first transparent workpiece along a first workpiece separation line. Forming the contour line includes focusing a pulsed laser beam propagating from a pivotable laser output head into a pulsed laser beam focal line oriented along a beam pathway and directed into the first transparent workpiece, the pulsed laser beam focal line generating an induced absorption within the first transparent workpiece; and translating the laminate workpiece stack and the pulsed laser beam focal line relative to each other along the first workpiece separation line, thereby laser forming the contour line having a plurality of defects along the first workpiece separation line. Further, the pivotable laser output head pivots the pulsed laser beam focal line as the laminate workpiece stack is translated relative to the pulsed laser beam focal line, such that the pulsed laser beam retains orthogonality with an impingement location of an outward facing surface of the first transparent workpiece. The method also includes separating the resin layer along a resin separation line. Separating the resin layer includes focusing the pulsed laser beam into the pulsed laser beam focal line oriented along the beam pathway and directed into the resin layer and translating the laminate workpiece stack and the pulsed laser beam focal line relative to each other along the resin separation line, thereby laser ablating the resin layer along the resin separation line.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4B-2 schematically depicts a second embodiment of a pulsed beam laser focal line in relationship to a transparent workpiece, according to one or more embodiments described herein;

FIG. 4B-3 schematically depicts a third embodiment of a pulsed beam laser focal line in relationship to a transparent workpiece, according to one or more embodiments described herein;

FIG. 4B-4 schematically depicts a fourth embodiment of a pulsed laser beam focal line in relationship to a transparent workpiece, according to one or more embodiments described herein;

DETAILED DESCRIPTION

Figure 1A:
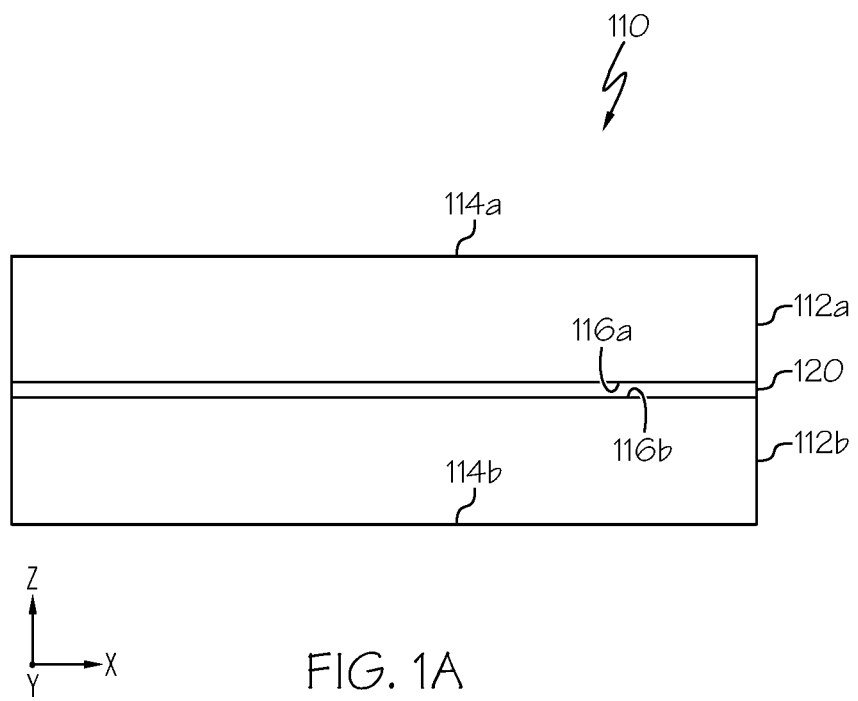
FIG. 1A depicts a side view of a laminate workpiece stack having a planar shape and including a resin layer positioned between two transparent workpieces, accordingly to one or more embodiments described herein.

Reference will now be made in detail to embodiments of processes for forming and laser processing laminate workpiece stacks comprising a plurality of material layers, such as transparent workpieces and resin layers, examples of which are illustrated in the accompanying drawings. Whenever possible, the same reference numerals will be used throughout the drawings to refer to the same or like parts. According to one or more embodiments described herein, the plurality of material layers of the laminate workpiece stack may comprise any combination of a first transparent workpiece, a second transparent workpiece, and a resin layer. In some embodiments, the resin layer may be positioned between and bonded to the first and second transparent workpieces. In other embodiments, the laminate workpiece stack may comprise the first transparent workpiece stacked onto the second transparent workpiece without the use of a resin layer. In yet other embodiments, the resin layer may be bonded to a single transparent workpiece. In an automotive context, example laminate workpiece stacks include vehicle windshields, vehicle side windows, vehicle back windows, vehicle sunroofs, or the like.

Laser processing the laminate workpiece stack may comprise directing (e.g., focusing) a laser beam (e.g., a pulsed laser beam) into the one or more layers of the laminate workpiece stack to separate the laminate workpiece stack into two or more pieces. For example, when the laminate workpiece stack comprises a vehicle windshield, the laser processing methods described herein may be used to trim a desired perimeter of the vehicle windshield to meet the tight tolerance requirements of vehicle manufacturing. Further, in some embodiments, the laminate workpiece stack may comprise at least one arcuate surface. Moreover, in some embodiments, the one or more layers of the laminate workpiece stack comprise different material properties, such that it may not be advantageous to laser process the one or more layers simultaneously, as each layer may respond differently to a single laser operation. Accordingly, the embodiments described herein provide methods and systems for forming and laser processing laminate workpiece stacks that in some embodiments include a resin layer disposed between a first transparent workpiece and a second transparent workpiece and in some embodiments include at least one arcuate surface.

As used herein, "laser processing" comprises directing a laser beam into and/or onto one or more of the plurality of layers of the laminate workpiece stack and translating the laser beam relative to the laminate workpiece stack along a desired line of separation. Examples of laser processing include using a pulsed laser beam to form a contour line comprising a series of defects into the transparent workpieces of the laminate workpiece stack, using a pulsed laser beam to laser ablate portions of the resin layer of the laminate workpiece stack, and using an infrared laser beam to heat the transparent workpieces of the laminate workpiece stack. Laser processing may separate the transparent workpieces and/or the resin layers along one or more desired lines of separation. However, in some embodiments, additional, non-laser steps may be utilized to separate the transparent workpieces and/or the resin layers of the laminate workpiece along one or more desired lines of separation.

The phrase "transparent workpiece," as used herein, means a workpiece formed from glass or glass-ceramic which is transparent, where the term "transparent," as used herein, means that the material has an optical absorption of less than about 20% per mm of material depth, such as less than about 10% per mm of material depth for the specified pulsed laser wavelength, or such as less than about 1% per mm of material depth for the specified pulsed laser wavelength. The transparent workpiece may have a depth (e.g., thickness) of from about 50 microns (μm) to about 10 mm (such as from about 100 μm to about 5 mm, or from about 0.5 mm to about 3 mm. Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchanged glasses may have coefficients of thermal expansion (CTE) of from about 6 ppm/C.° to about 10 ppm/C.°. Other example transparent workpieces may comprise EAGLE XG®, CONTEGO, and CORNING LOTUS™ available from Corning Incorporated of Corning, N.Y. Moreover, the transparent workpiece may comprise other components which are transparent to the wavelength of the laser, for example, crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

The phrase "contour line," as used herein, denotes a line (e.g., a line, a curve, etc.) formed along or near a desired line of separation on a surface of a transparent workpiece along which a transparent workpiece will be separated into multiple portions upon exposure to the appropriate processing conditions. The contour line generally consists of a series of defects introduced into the transparent workpiece using various techniques. These defects may be referred to, in various embodiments herein, as line defects, perforations, or nano-perforations in the workpiece. As used herein, a "defect" may include an area of modified material (relative to the bulk material), void space, crack, scratch, flaw, hole, or other deformities in the transparent workpiece. Further, the transparent workpiece may be separated along the contour line, for example, using an infrared laser or other laser configured to heat the area of the transparent workpiece adjacent to the contour line or to bend, scribe, or otherwise mechanically stress the transparent workpiece. In other embodiments, the transparent workpiece may be mechanically stressed to cause separation, or separation may occur spontaneously. While not intended to be limited by theory, stressing the transparent workpiece at the contour line may propagate a crack along the contour line.

The phrase "resin layer," as used herein, denotes a layer of ductile material that may be bonded to one or more transparent workpieces of the laminate workpiece stack. For example, the resin layer may be positioned between and bonded to transparent workpieces to form the laminate workpiece stack, for example vehicle glass laminates such as vehicle windshields, vehicle side windows, vehicle back windows, vehicle sunroofs, or the like. When positioned between and bonded to transparent workpieces, the resin layer may hold together shards of the transparent workpiece when the laminate workpiece stack undergoes an unintended cracking or breaking event. Example resin layer materials include polyvinyl butryal, ethylene-vinyl acetate, combinations thereof, or the like.

As the resin layer is ductile, the resin layer may be separated using different laser processing methods than the brittle, transparent workpieces. For example, forming a contour line comprising a series of defects within the resin layer will not generate a continuous crack propagation between the defects along the contour line as would be the case for brittle materials such as glass. Thus, to separate the resin layer along the desired line of separation, laser ablation may be performed, for example, using a pulsed laser beam. Further, when the resin layer is positioned between transparent workpieces, it may be advantageous to separate at least one of the transparent workpieces along the desired line of separation before or simultaneous with separating the resin layer such that the ablated material of the resin layer has a pathway to exit the laminate workpiece stack. If the ablated material of the resin layer is unable to exit the laminate workpiece stack, e.g., if the resin layer is ablated before at least one transparent workpiece is separated; the ablated material of the resin layer may damage the transparent workpieces of the laminate workpiece stack.

Figure 1B:
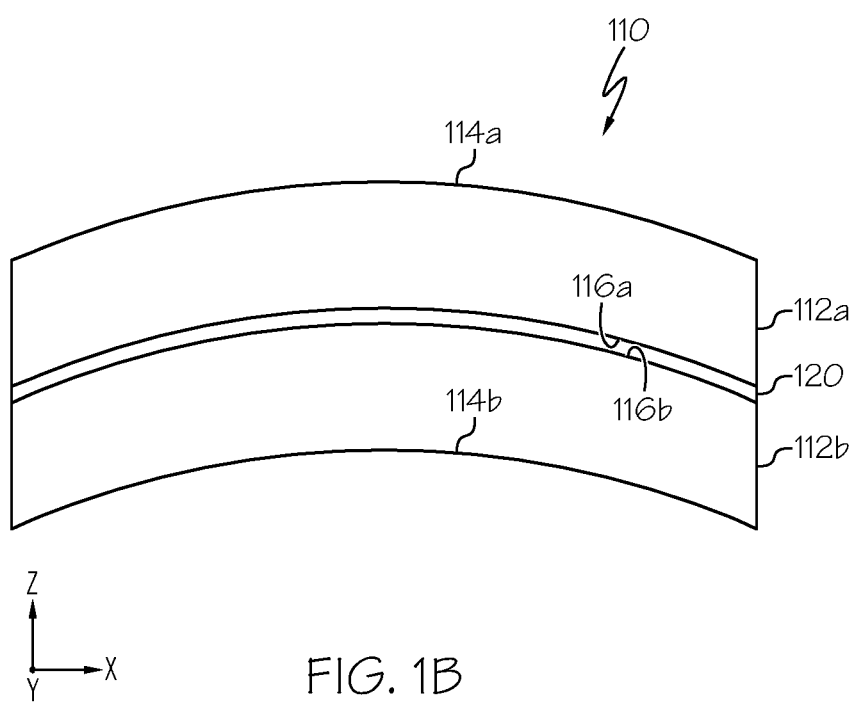
FIG. 1B depicts a side view of a laminate workpiece stack having an arcuate shape and including a resin layer positioned between two transparent workpieces, according to one or more embodiments described herein.

Referring now to FIGS. 1A and 1B, a laminate workpiece stack 110 comprising a plurality of material layers, for example, a plurality of transparent workpieces 112 and a resin layer 120 is depicted. The laminate workpiece stack 110 depicted in FIGS. 1A and 1B comprises a first transparent workpiece 112a, a second transparent workpiece 112b, and the resin layer 120. The resin layer 120 is disposed between and bonded to the first transparent workpiece 112a and the second transparent workpiece 112b. Further, the first transparent workpiece 112a and the second transparent workpiece 112b each comprise an outward facing surface 114a, 114b opposite an inward facing surface 116a, 116b. As depicted in FIGS. 1A and 1B, the outward facing surfaces 114a, 114b each face outward from the resin layer 120 and the inward facing surfaces 116a, 116b each face toward and contact the resin layer 120. While not depicted, in some embodiments, the laminate workpiece stack 110 may comprise additional layers, for example, additional material layers of transparent workpieces 112 and resin layers 120.

Further, the laminate workpiece stack 110 may be planar or arcuate. For example the plurality of transparent workpieces 112 and the resin layer 120 depicted in FIG. 1A are planar and the plurality of transparent workpieces 112 and the resin layer 120 depicted in FIG. 1B are arcuate. In arcuate embodiments, the laminate workpiece stack 110 may comprise a slope along at least one surface the laminate workpiece stack 110 (e.g., the outward facing surfaces 114a, 114b of the first and second transparent workpieces 112a, 112b) of from about 5° to about 20°, for example 8°, 10°, 12°, 15°, 18° or the like. Vehicle glass laminates, such as vehicle windshields, vehicle side windows, vehicle back windows, vehicle sunroofs, or the like, are example embodiments of the laminate workpiece stack 110 that are arcuate.

Figure 1C:
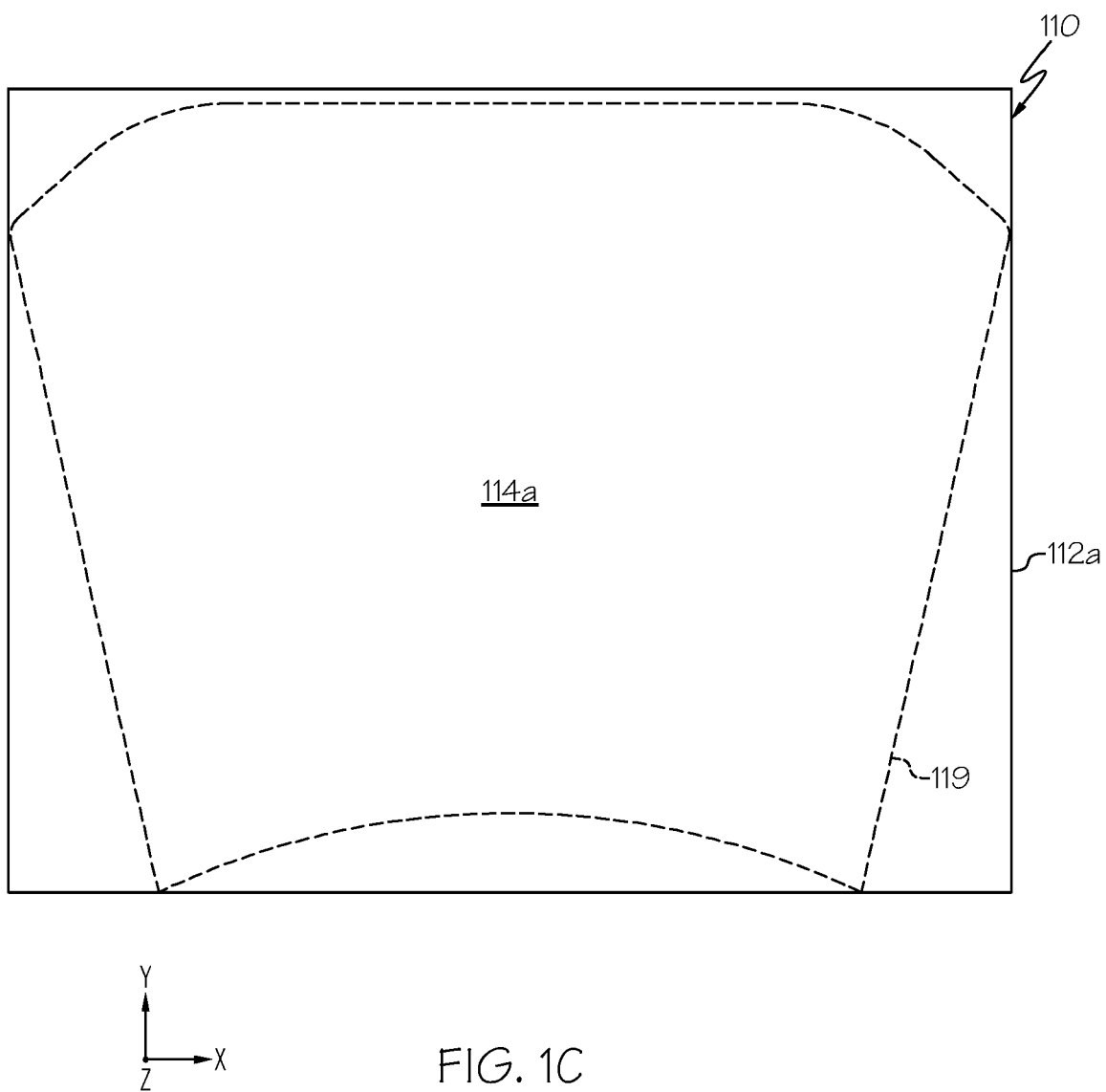
FIG. 1C depicts a top view of a laminate workpiece stack, according to one or more embodiments described herein.

Referring now to FIG. 1C, a top view of the laminate workpiece stack 110 is depicted. Particularly, FIG. 1C depicts the outward facing surface 114a of the first transparent workpiece 112a and a desired perimeter 119 of the laminate workpiece stack 110. The desired perimeter 119 denotes a line of desired separation of the laminate workpiece stack 110, for example, in embodiments in which the laminate workpiece stack 110 is processed into a vehicle windshield. For example, the laminate workpiece stack 110 may be laser processed and separated along the desired perimeter 119 using the methods described herein.

Referring now to FIGS. 2-6, an example transparent workpiece 112 of the laminate workpiece stack 110 is schematically depicted undergoing laser processing according to the methods described herein. In particular, FIGS. 2-7A schematically depict the formation of a contour line 102 comprising a plurality of defects 105, which may be used to separate the transparent workpieces 112 of the laminate workpiece stack. The methods of FIGS. 2-7A may be used to laser process the transparent workpieces 112 and additional laser processing steps (e.g., laser ablation) may be used to separate the resin layer 120. Accordingly, the methods of FIGS. 2-7A in combination with additional laser ablation steps described below may be used to separate the laminate workpiece stack 110, for example, to trim a perimeter of a vehicle windshield. Trimming the perimeter of the vehicle windshield or other laminate workpiece stack using laser processing may be advantageous because laser processing can be performed without coupling any separating tools to the excess workpiece material positioned outside of the desired perimeter, allowing a pre-laser processed laminate workpiece stack to have minimal excess workpiece material positioned outside of the desired perimeter.

Figure 2:
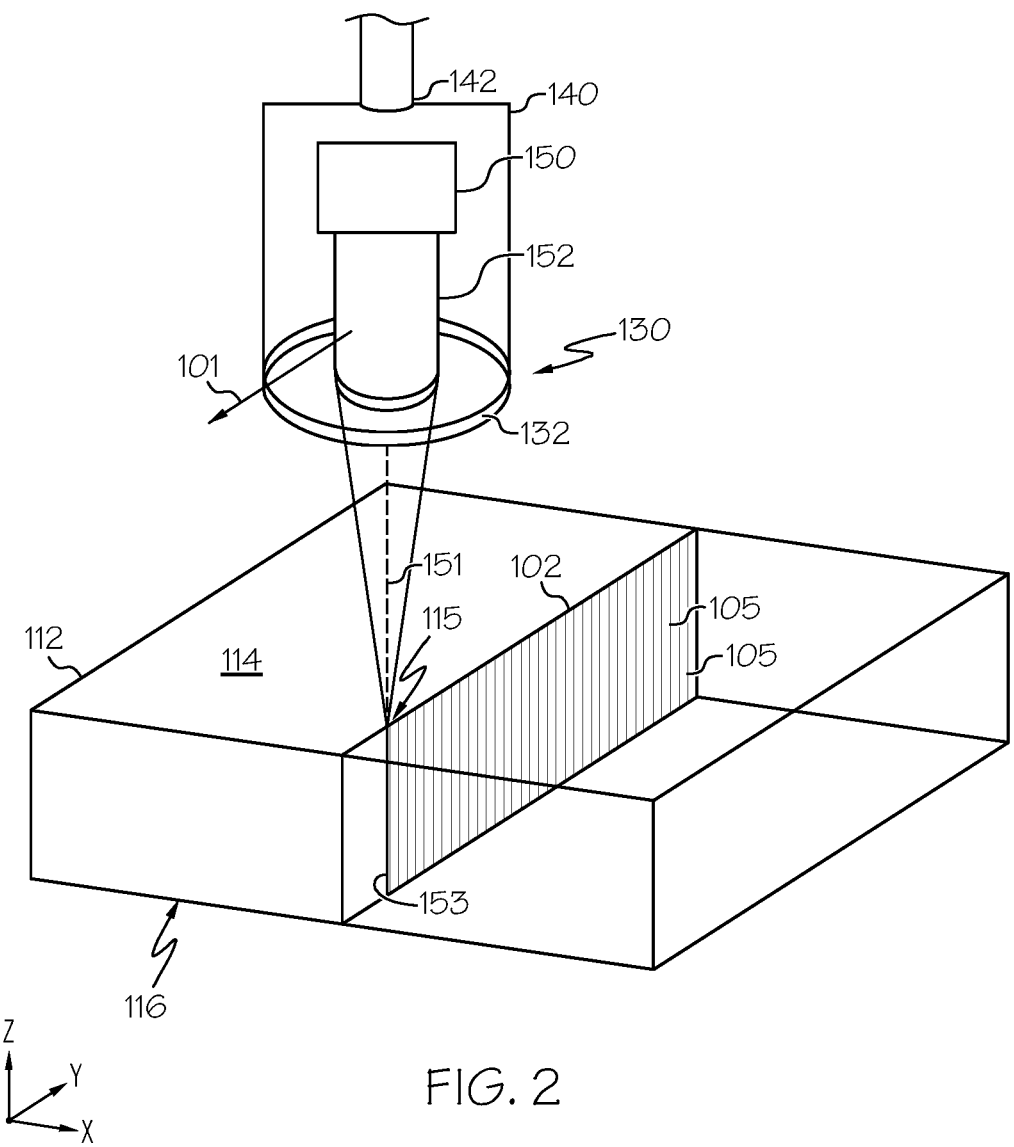
FIG. 2 schematically depicts the formation of a contour line of line defects in a transparent workpiece according to one or more embodiments described herein.

As illustrated in FIG. 2, the contour line 102 comprising the plurality of defects 105 may be formed by processing the transparent workpiece 112 with an ultra-short pulsed laser beam 152 moving in a translating direction 101. The defects 105 may extend, for example, through the depth of the transparent workpiece 112, and may be orthogonal to an imaging surface of the transparent workpiece 112. As used herein, "imaging surface" of the transparent workpiece 112 is the surface of the transparent workpiece 112 at which the pulsed laser beam 152 initially contacts the transparent workpiece 112, for example, at an impingement location 115.

Figure 7A:
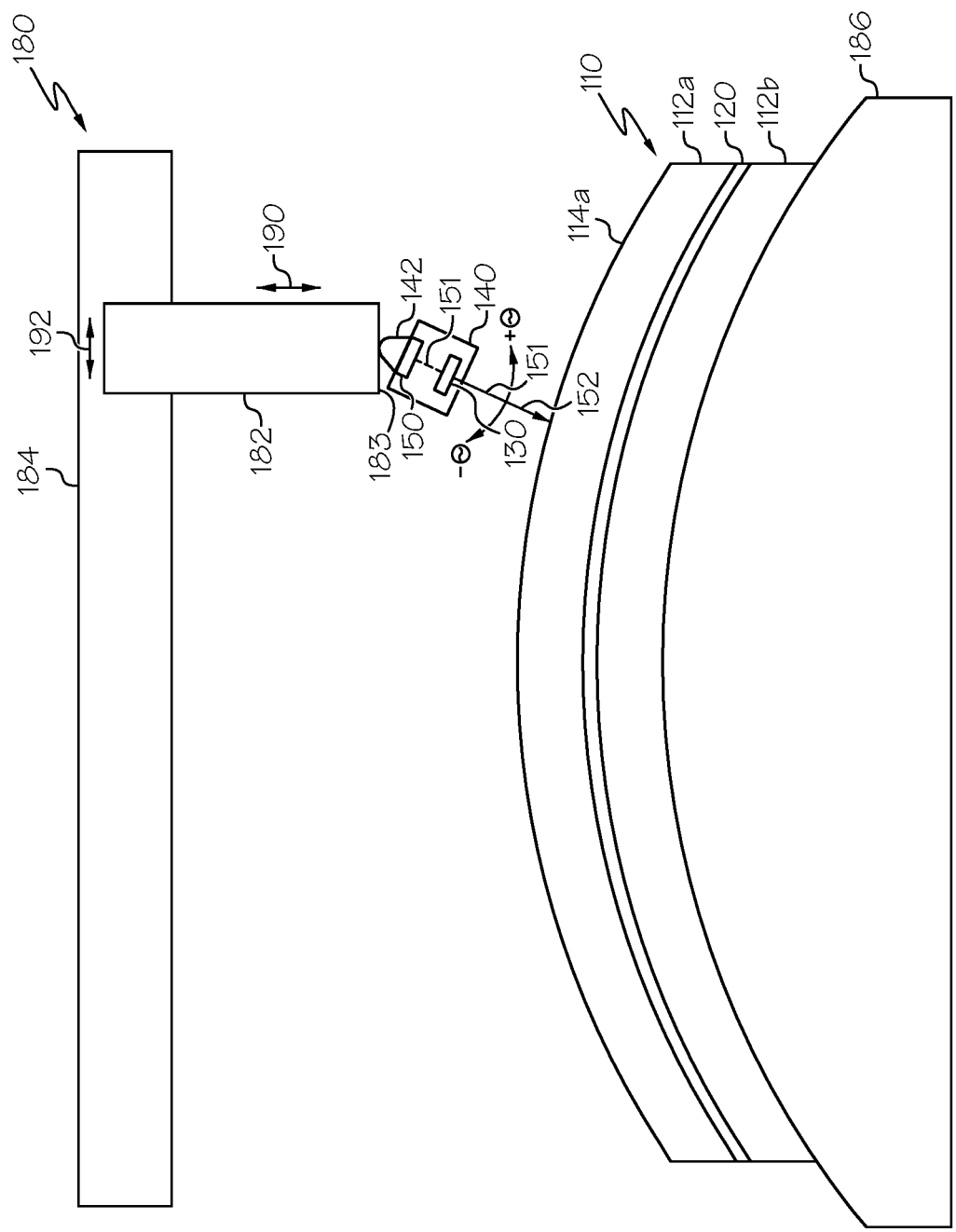
FIG. 7A schematically depicts an embodiment of a workpiece manufacturing system for laser processing a laminate workpiece stack, according to one or more embodiments described herein.

Further, while the transparent workpiece 112 depicted in FIG. 2 is planar, in embodiments, in which the transparent workpiece 112 is arcuate, as depicted in FIG. 1B, the pulsed laser beam 152 may propagate from a pivotable laser output head 140. The pivotable laser output head 140 is configured to alter the propagation direction of the pulsed laser beam 152, thereby altering the beam pathway 151, such that the pulsed laser beam 152 may contact the transparent workpiece 112 substantially orthogonal to the outward facing surface 114 of the transparent workpiece 112 at the impingement location 115. In some embodiments, the pivotable laser output head 140 may comprise a pivot joint 142, which pivotably connects the pivotable laser output head 140 to a first translation arm 182 of a workpiece manufacturing system 180 (FIG. 7A). In some embodiments, the pivotable laser output head 140 may alternatively or additionally house an optical assembly 130 used to laser process the laminate workpiece stack 110 may include one or more pivotable optical components 131 (FIG. 7B), such as a beam steering mirror, for example, an F-theta galvanometer.

As illustrated in FIG. 2, the plurality of defects 105 may define the contour line 102 and the contour line 102 delineates a line of intended separation about which the transparent workpiece 112 may be separated into two or more portions (e.g., the contour line 102 may be formed into each of first transparent workpiece 112a and the second transparent workpiece 112b of the laminate workpiece stack 110 along the desired perimeter 119 of the laminate workpiece stack 110). The plurality of defects 105 extend into the surface of the transparent workpiece 112 and establish a path for crack propagation for separation of the transparent workpiece 112 into separate portions along the contour line 102. Forming the contour line 102 comprises translating the pulsed laser beam 152 relative to the transparent workpiece 112 (e.g., in the translating direction 101) to form the plurality of defects 105 of the contour line 102. According to one or more embodiments, the pulsed laser beam 152 may be translated across the transparent workpiece 112 by motion of the transparent workpiece 112, motion of the pulsed laser beam focal line 153 (e.g., motion of the pivotable laser output head 140), or motion of both the transparent workpiece 112 and the pulsed laser beam focal line 153. By translating the pulsed laser beam focal line 153 relative to the transparent workpiece 112, the plurality of defects 105 may be formed in the transparent workpiece 112. Moreover, while the contour line 102 illustrated in FIG. 2 is linear, the contour line 102 may also be nonlinear (i.e., having a curvature). Curved contour lines may be produced, for example, by translating either the transparent workpiece 112 or pulsed laser beam 152 with respect to the other in two dimensions instead of one dimension. As an example, a contour line 102 formed along the desired perimeter 119 depicted in FIG. 2 would be a non-linear contour line 102.

In some embodiments, the transparent workpiece 112 may be further acted upon in a subsequent separating step to induce separation of the transparent workpiece 112 along the contour line 102. The subsequent separating step may include using mechanical force or thermal stress induced force. The thermal source, such as an infrared laser beam (e.g., infrared laser beam 162 output by an infrared beam source 160 depicted in FIGS. 8B and 9C), may be used to create thermal stress and thereby separate the transparent workpiece 112 at the contour line 102. In embodiments, an infrared laser may be used to initiate spontaneous separation and then the separation may be finished mechanically. Suitable infrared lasers to create thermal stress in glass would typically have wavelengths that are readily absorbed by glass, typically having wavelengths ranging from 1.2 µm to 13 µm, for example, a range of 4 µm to 12 µm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 112 near the contour line 102.

The infrared laser beam, such as a laser beam produced by the infrared beam source 160 (FIGS. 8B and 9C), for example, a carbon dioxide laser (a "$CO_2$ laser"), a carbon monoxide laser (a "CO laser"), a solid state laser, a laser diode, or combinations thereof, is a controlled heat source that rapidly increases the temperature of the transparent workpiece 112 at or near the contour line 102. This rapid heating may build compressive stress in the transparent workpiece 112 on or adjacent to the contour line 102. Since the area of the heated glass surface is relatively small compared to the overall surface area of the transparent workpiece 112, the heated area cools relatively rapidly. The resultant temperature gradient induces tensile stress in the transparent workpiece 112 sufficient to propagate a crack along the contour line 102 and through the depth of the transparent workpiece 112, resulting in full separation of the transparent workpiece 112 along the contour line 102. Without being bound by theory, it is believed that the tensile stress may be caused by expansion of the glass (i.e., changed density) in portions of the workpiece with higher local temperature.

In other embodiments, the stress inducing source may comprise a subsequent pulsed laser beam focal line directed into the first transparent workpiece 112a at a location along or near the contour line 102 and translating the laminate workpiece stack 110 and the second pulsed laser beam focal line relative to each other along or near the contour line 102 that comprises a greater pulse energy than the pulsed laser beam focal line 153 (e.g., a first pulsed laser beam focal line) used to form the plurality of defects 105 of the contour line 102. In still other embodiments, stress present in the transparent workpiece, depending on the type, depth, and material properties (e.g., absorption, CTE, stress, composition, etc.) may cause spontaneous separation along the contour line 102 without further heating or mechanical separation steps. For example, when the transparent workpiece 112 comprises a strengthened glass substrate (e.g., an ion-exchanged or thermally tempered glass substrate), the formation of the contour line 102 may induce crack propagation along the contour line 102 to separate the transparent workpiece 112.

For some transparent workpieces 112, the distance, or periodicity, between adjacent defects 105 along the direction of the contour lines 102 may be at least about 0.1 µm or 1 µm and less than or equal to about 20 µm or even 30 µm. For example, in some transparent workpieces 112, the periodicity between adjacent defects 105 may be from about 0.5 to about 15 µm, or from about 3 µm to about 10 µm, or from about 0.5 µm to about 3.0 µm. For example, in some transparent workpieces the periodicity between adjacent defects 105 may be from about 0.5 µm to about 1.0 µm, or may be least about 1 µm, such as at least about 5 µm, or from about 1 µm to about 15 µm at the imaging surface of the transparent workpiece 112. In embodiments in which the pulsed laser beam focal line 153 impinges the transparent workpiece 112 orthogonal to the impingement location 115 of the transparent workpiece 112, the spacing distance between two adjacent defects 105 is uniform through the depth d of the transparent workpiece 112. Further, in embodiments in which the pulsed laser beam focal line 153 impinges the transparent workpiece 112 at a non-orthogonal angle with respect to an impingement location 115 of the transparent workpiece 112, the spacing between two adjacent defects 105 at the imaging surface of the transparent workpiece 112 may be different than the spacing between the two adjacent defects 105 at a surface opposite the imaging surface. In this embodiment, the above distances may be the average distance between adjacent defects 105 through the depth d of the transparent workpiece 112.

According to various embodiments, there are several methods to create the contour line 102 by processing with a pulsed laser beam focal line 153 of the pulsed laser beam 152. The pulsed laser beam 152 may be output by the beam source 150. The optical method of forming the pulsed laser beam focal line 153 includes use of an optical assembly 130, which may take multiple forms, including spherical lenses, axicon lenses, diffractive elements, segmenting focal element, or other methods to form the linear region of high intensity. Further, the optical assembly 130 may include the pivotable optical component 131 (FIG. 7B) to control the beam propagation direction of the pulsed laser beam 152 and the pulsed laser beam focal line 153. Moreover, the type of beam source 150 (picosecond laser, femtosecond laser, etc.), the wavelength of the pulsed laser beam 152 output by the beam source 150 (infrared, green, UV, etc.), and the pulse energy output by the pulsed laser beam 152 may also be varied, as long as sufficient optical intensities are reached to create breakdown of the transparent workpiece material and ablation of the resin layer material in the region of focus on the transparent workpiece 112 through nonlinear optical effects. According to one or more embodiments, the beam source 150 may be a pulse burst laser which allows for control of the energy deposition with time by adjusting the number of pulses within a given burst.

For example, an embodiment of the beam source 150 comprising an ultra-short pulsed laser may be used to create a high aspect ratio vertical defect 105 in a consistent, controllable, and repeatable manner. According to one embodiment, optical techniques are used to create a high intensity pulsed laser beam focal line 153 of within the transparent workpiece 112. In one embodiment, an axicon lens element is used in an optical lens assembly to create a region of high aspect ratio, taper-free line defects using ultra-short (picoseconds or femtosecond duration) Bessel beams. In other words, the axicon condenses the laser beam into a high intensity region of cylindrical shape and high aspect ratio (long length and small diameter). Due to the high intensity created with the pulsed laser beam focal line 153, nonlinear interaction of the electromagnetic field of the pulsed laser beam focal line 153 and the material of the transparent workpiece 112 may occur and the laser energy may be transferred to the transparent workpiece 112 to effect formation of the defects 105 that become constituents of the contour line 102.

Figure 3:
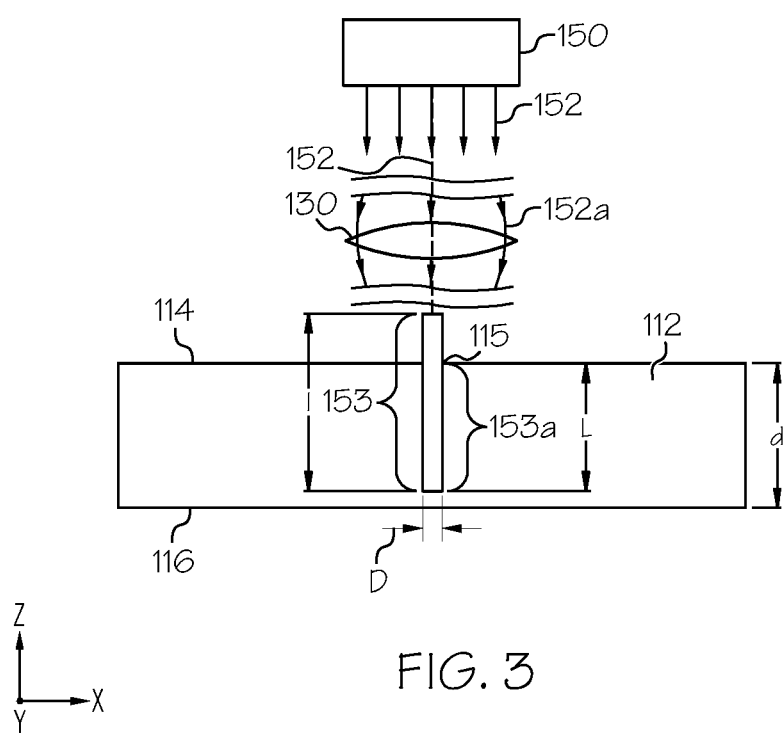
FIG. 3 schematically depicts the positioning of a pulsed laser beam focal line during processing of a transparent workpiece, according to one or more embodiments described herein.

Now referring to FIG. 3, a method for forming the contour line 102 may include focusing the pulsed laser beam 152 into the pulsed laser beam focal line 153 oriented along the beam pathway 151. As shown in FIG. 3, a beam source 150 emits the pulsed laser beam 152, which has a portion 152a incident to an optical assembly 130. The optical assembly 130 turns the incident laser beam portion 152a into the pulsed laser beam focal line 153 on the output side over a defined expansion range along the beam direction (length l of the pulsed laser beam focal line 153). The transparent workpiece 112 is positioned in the beam pathway 151 to at least partially overlap the pulsed laser beam focal line 153 of pulsed laser beam 152. The pulsed laser beam focal line 153 is thus directed into the transparent workpiece 112 having a depth d.

Referring now to FIGS. 2 and 3, the impingement location 115 of the transparent workpiece 112 is aligned orthogonal to the pulsed laser beam focal line 153 and the pivotable laser output head 140, which may house a portion or all of the optical assembly 130 and may pivot during the formation of the contour line 102 to retain the pulsed laser beam focal line 153 orthogonal the transparent workpiece 112. As depicted in FIG. 3, the transparent workpiece 112 may be positioned relative to the pulsed laser beam focal line 153 such that the pulsed laser beam focal line 153 starts before or at the outward facing surface 114 of the transparent workpiece 112 and stops before the inward facing surface 116 of the transparent workpiece 112 (i.e., the pulsed laser beam focal line 153 terminates within the transparent workpiece 112 and does not extend beyond the inward facing surface 116). Thus, when the transparent workpiece 112 is positioned within the laminate workpiece stack 110, the pulsed laser beam focal line 153 may stop before reaching the resin layer 120.

Moreover, it is desirable to position the pulsed laser beam focal line 153 relative to the transparent workpiece 112 such that the pulsed laser beam focal line 153 extends into the transparent workpiece 112 orthogonal to the imaging plane (e.g., the outward facing surface 114) of the transparent workpiece 112 at the impingement location 115 of the transparent workpiece 112. If the pulsed laser beam focal line 153 is not orthogonal the transparent workpiece 112, the pulsed laser beam focal line 153 shifts and spreads along the depth of the transparent workpiece 112, causing the pulsed laser beam focal line 153 to distribute energy over a larger volume of the transparent workpiece 112, lowering the sharpness and focus of the pulsed laser beam focal line 153 and generating lower quality, less uniform defects 105 within the transparent workpiece 112.

Referring still to FIGS. 2 and 3, in the overlapping area of the pulsed laser beam focal line 153 with the transparent workpiece 112 (i.e., in the transparent workpiece material covered by the pulsed laser beam focal line 153), the pulsed laser beam focal line 153 generates (assuming suitable laser intensity along the pulsed laser beam focal line 153, which intensity is ensured by the focusing of pulsed laser beam 152 on a section of length l, i.e. a line focus of length l) a section 153a (aligned along the longitudinal beam direction) along which an induced absorption is generated in the material of the transparent workpiece 112. The induced absorption produces a defect formation in the transparent workpiece material along section 153a. The defect 105 is a microscopic (e.g., having an internal diameter of from about 100 nm to about 0.5 µm) elongated defect in the transparent workpiece 112 which may be generated by using a single high energy burst of multiple laser pulses. A series of these defects 105 creates a perforation pattern in the transparent workpiece 112 along the contour line 102. For example, individual defects 105 may be created at rates of several hundred kilohertz (i.e., several hundred thousand defects per second). With relative motion between the pulsed laser beam focal line 153 and the transparent workpiece 112, these defects 105 may be placed adjacent to one another (spatial separation varying from sub-micron to many microns as desired). This spatial separation (pitch) may be selected to facilitate separation of the transparent workpiece 112. In some embodiments, the defect 105 is a "through defect", which is a defect that extends from the outward facing surface 114 to the inward facing surface 116. The defect formation is not only local, but over the entire length of the section 153a of the induced absorption. The length of section 153a (which corresponds to the length of the overlapping of the pulsed laser beam focal line 153 with the transparent workpiece 112) is labeled with reference L. The internal diameter of the defect area (i.e., the defect 105) at the section 153a of the induced absorption is labeled with reference D. This internal diameter D basically corresponds to the average diameter of the pulsed laser beam focal line 153, that is, an average spot diameter in a range of between about 0.1 µm and about 5 µm.

Representative optical assemblies 130, which may be applied to generate the pulsed laser beam focal line 153, as well as a representative optical setup, in which these optical assemblies 130 may be applied, are described below. Further, each of the representative optical assemblies 130 may be fully or partially housed within the pivotable laser output head 140. In some embodiments, as depicted in FIG. 2, both the beam source 150 and the optical assembly 130 may be housed within the pivotable laser output head 140 and the pivotable laser output head 140 may be pivotable about the pivot joint 142 such that the beam source 150 and each component of the optical assembly 130 remain aligned relative to each other during movement of the pivotable laser output head 140. In other embodiments, the optical assembly 130 may include the pivotable optical component 131, such as a beam steering mirror (FIG. 7B), which may control the direction of the beam pathway 151 and thereby control the direction of the pulsed laser beam focal line 153. Further, as used herein "upstream" and "downstream" refer to the relative position of two locations or components along the beam pathway 151 with respect to the beam source 150. For example, a first component is upstream from a second component if the pulsed laser beam 152 traverses the first component before traversing the second component. Further, a first component is downstream from a second component if the pulsed laser beam 152 traverses the second component before traversing the first component.

Figure 4A:
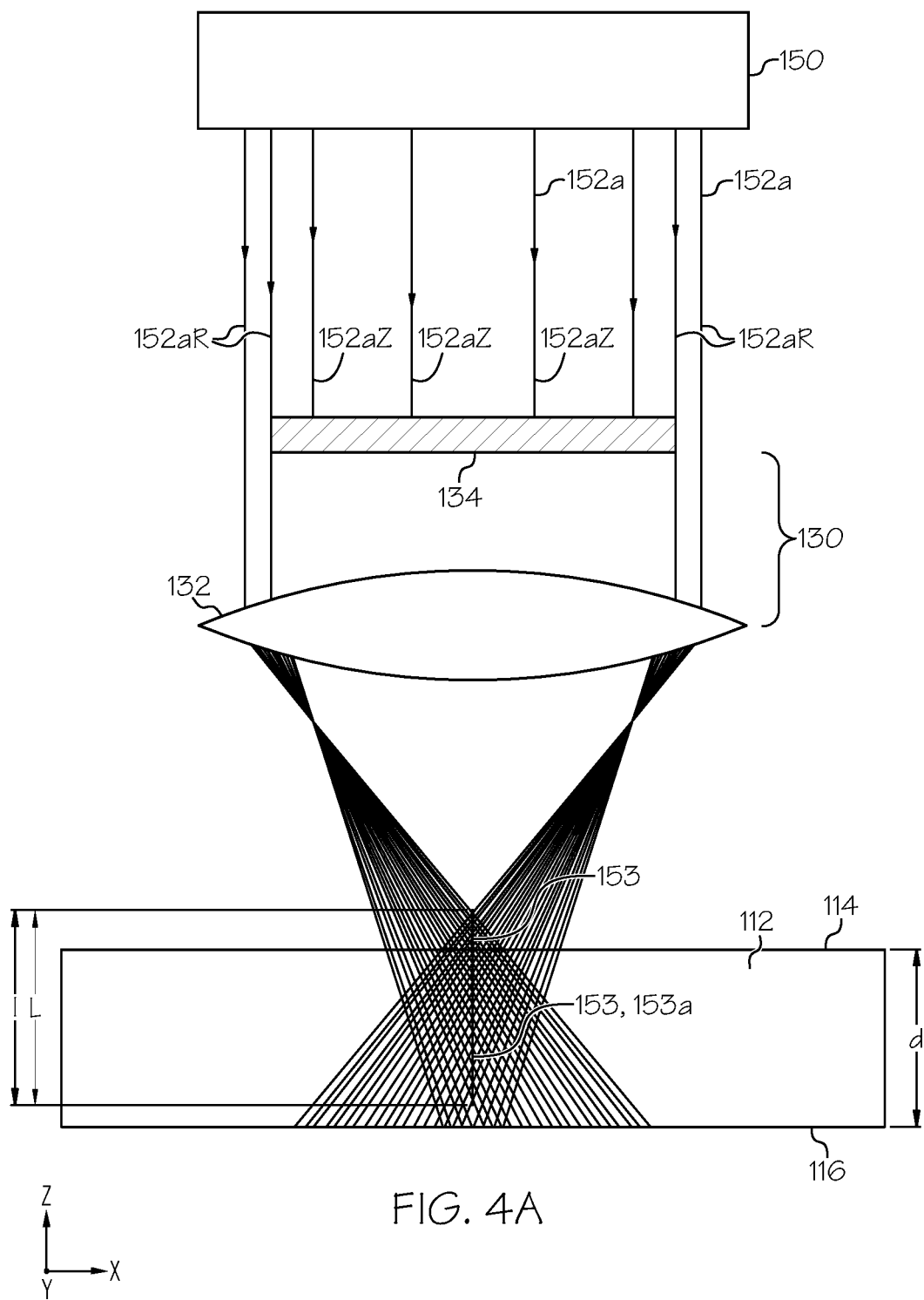
FIG. 4A schematically depicts an optical assembly for pulsed beam laser processing, according to one or more embodiments described herein.

Referring now to FIG. 4A, the optical assembly 130 may comprise both the lens 132 and an aperture 134 (e.g., a circular aperture). As depicted in FIG. 4A, the portion 152a of the pulsed laser beam 152 emitted by the beam source 150 incident to the optical assembly 130 is first directed onto the aperture 134 which is opaque to the wavelength of laser radiation used. Aperture 134 is oriented perpendicular to the longitudinal beam axis and is centered on the central portion of the depicted beam portion 152a. The diameter of the aperture 134 is selected in such a way that the laser radiation near the center of beam portion 152a (i.e., the central beam portion, here labeled with 152aZ) hit the aperture 134 and is completely absorbed by it. Only the beams in the outer perimeter range of beam portion 152a (i.e., marginal rays, here labeled with 152aR) are not absorbed by the circular aperture 134 due to the reduced aperture size compared to the beam diameter, and pass aperture 134 laterally and hit the marginal areas of the focusing lens 132 of the optical assembly 130, which, in this embodiment, is designed as a spherically cut, bi-convex lens.

As illustrated in FIG. 4A, the pulsed laser beam focal line 153 may not only be a single focal point for the pulsed laser beam 152, but rather a series of focal points for different rays in the pulsed laser beam 152. The series of focal points form an elongated pulsed laser beam focal line 153 of a defined length, shown in FIG. 4A as the length l of the pulsed laser beam focal line 153. Lens 132 may be centered on the central beam and may be designed as a non-corrected, bi-convex focusing lens in the form of a common, spherically cut lens. As an alternative, aspheres or multi-lens systems deviating from ideally corrected systems, which do not form an ideal focal point but a distinct, elongated pulsed laser beam focal line 153 of a defined length, may also be used (i.e., lenses or systems which do not have a single focal point). The zones of the lens 132 thus focus along the pulsed laser beam focal line 153, subject to the distance from the lens center. The diameter of aperture 134 across the beam direction may be approximately 90% of the diameter of the pulsed laser beam 152 (defined by the distance required for the intensity of the beam to decrease to $1/e^2$ of the peak intensity) and approximately 75% of the diameter of the lens 132 of the optical assembly 130. The pulsed laser beam focal line 153 of a non-aberration-corrected spherical lens 132 generated by blocking out the beam bundles in the center is thus used. FIG. 4A shows a section in one plane through the central beam, and the complete three-dimensional bundle may be seen when the depicted beams are rotated around the pulsed laser beam focal line 153.

Figures 1, 4B:
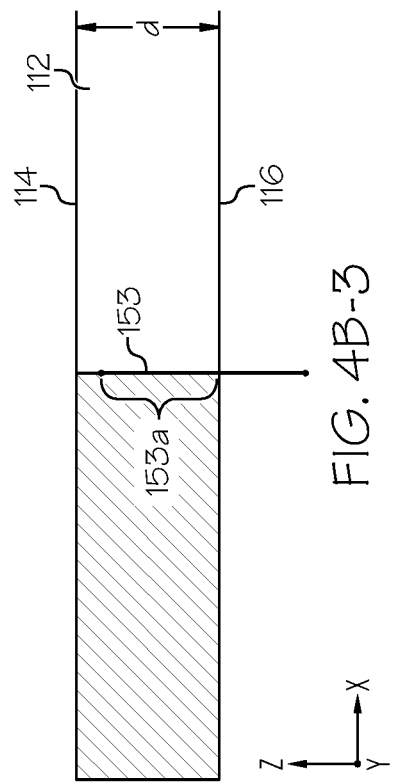
FIG. 4B-1 schematically depicts a first embodiment of a pulsed beam laser focal line in relationship to a transparent workpiece, according to one or more embodiments described herein.
Figures 2, 4B:
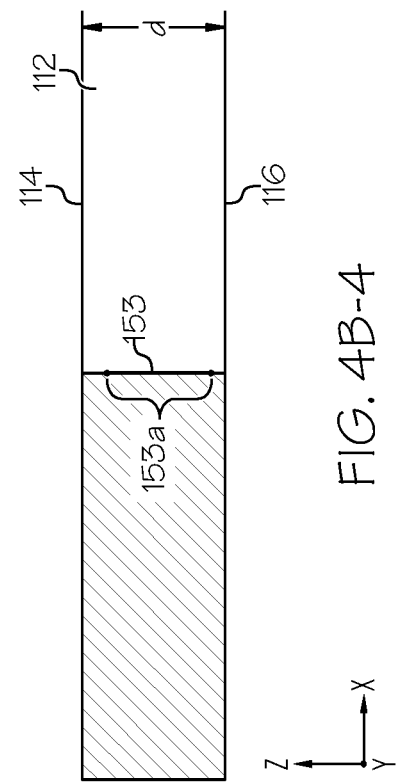
Figures 3, 4B:
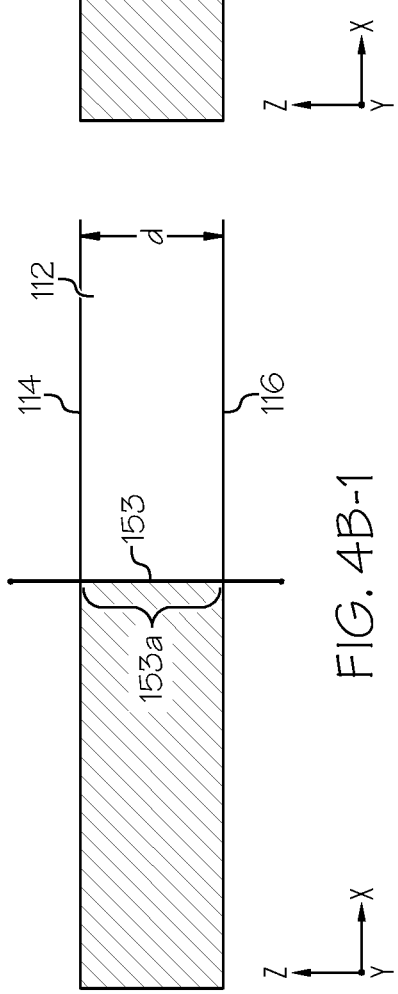
Figures 4, 4B:
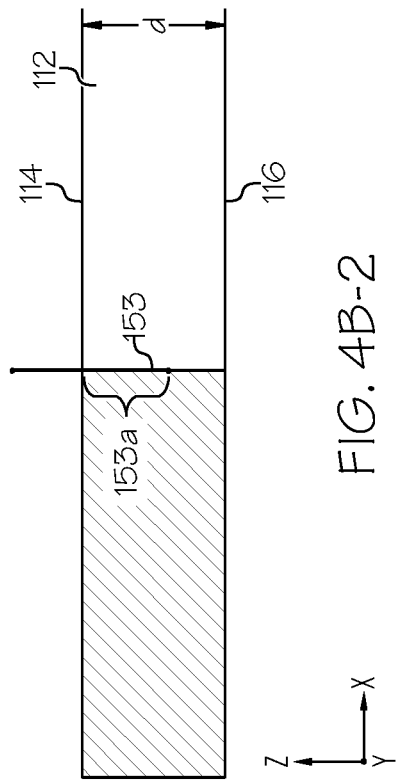

FIG. 4B-1 through FIG. 4B-4 show (not only for the optical assembly in FIG. 4A, but also for any other applicable optical assemblies 130) that the position of the pulsed laser beam focal line 153 may be controlled by suitably positioning and/or aligning the optical assembly 130 relative to the transparent workpiece 112 as well as by suitably selecting the parameters of the optical assembly 130. As FIG. 4B-1 illustrates, the length l of the pulsed laser beam focal line 153 may be adjusted in such a way that it exceeds the depth d of the transparent workpiece 112 (here by factor 2). If the transparent workpiece 112 is placed (viewed in longitudinal beam direction) centrally to the pulsed laser beam focal line 153, the extensive section of induced absorption (e.g., section 153a) may be generated over the entire workpiece depth d. The pulsed laser beam focal line 153 may have a length l in a range of from about 0.01 mm to about 100 mm or in a range of from about 0.1 mm to about 10 mm. Various embodiments may be configured to have a pulsed laser beam focal line 153 with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. In some embodiments, the length l of the pulsed laser beam focal line 153 may be tuned, using the optical assembly 130, to correspond with the depth d of the transparent workpiece 112, for example, the laser beam focal line 153 may be tuned, using the optical assembly 130, such that the length l of the laser beam focal line 153 is between about 1.1 to about 1.8 times larger than the depth d of the transparent workpiece 112, for example 1.25, 1.5, or the like. As one example, in embodiments in which the transparent workpiece 112 comprises a depth of about 0.7 mm, the pulsed laser beam focal line 153 may comprise a length of about 0.9 mm. Further, in other embodiments, the laser beam focal line 153 may be tuned, using the optical assembly 130, such that the length l of the laser beam focal line 153 is substantially equal the depth d of the transparent workpiece 112.

In the case shown in FIG. 4B-2, a pulsed laser beam focal line 153 of length l is generated which generally corresponds to the workpiece depth d. Since the transparent workpiece 112 is positioned relative to the pulsed laser beam focal line 153 in such a way that the pulsed laser beam focal line 153 starts at a point outside the transparent workpiece 112, the length l of the extensive section of induced absorption 153a (which extends from the outward facing surface 114 to a defined workpiece depth, but not to the inward facing surface 116 is smaller than the length l of the pulsed laser beam focal line 153. FIG. 4B-3 shows the case in which the transparent workpiece 112 (viewed along a direction perpendicular to the beam direction) is positioned above the starting point of the pulsed laser beam focal line 153 so that, as in FIG. 4B-2, the length l of pulsed laser beam focal line 153 is greater than the length l of the section of induced absorption 153a in the transparent workpiece 112. The pulsed laser beam focal line 153 thus starts within the transparent workpiece 112 and extends beyond the inward facing surface 116. FIG. 4B-4 shows the case in which the focal line length l is smaller than the workpiece depth d so that, in the case of a central positioning of the transparent workpiece 112 relative to the pulsed laser beam focal line 153 viewed in the direction of incidence, the pulsed laser beam focal line 153 starts near the outward facing surface 114 within the transparent workpiece 112 and ends near the inward facing surface 116 within the transparent workpiece 112 (e.g., l=0.75 d).

In the embodiments described herein, it may be advantageous to position the pulsed laser beam focal line 153 in such a way that the outward facing surface 114 is covered by the pulsed laser beam focal line 153 (e.g. the setup of FIG. 4B-1 or FIG. 4B-2), so that the section 153a of induced absorption starts at the outward facing surface 114 of the transparent workpiece 112. Moreover, in some embodiments, it may be advantageous to position the pulsed laser beam focal line 153 such that the pulsed laser beam focal line 153 terminates at or prior to reaching the inward facing surface 116 (FIGS. 4B-2 and FIG. 4B-4), such that the pulsed laser beam focal line 153 does not impinge the resin layer 120, in embodiments in which the resin layer 120 is bonded to the inward facing surface 116 (FIGS. 1A and 1B) of the transparent workpiece 112 such that the pulsed laser beam focal line 153 does not alter the material of the resin layer 120 when forming the contour line 102 in one or more of the first transparent workpiece 112a or the second transparent workpiece 112b.

Figure 5:
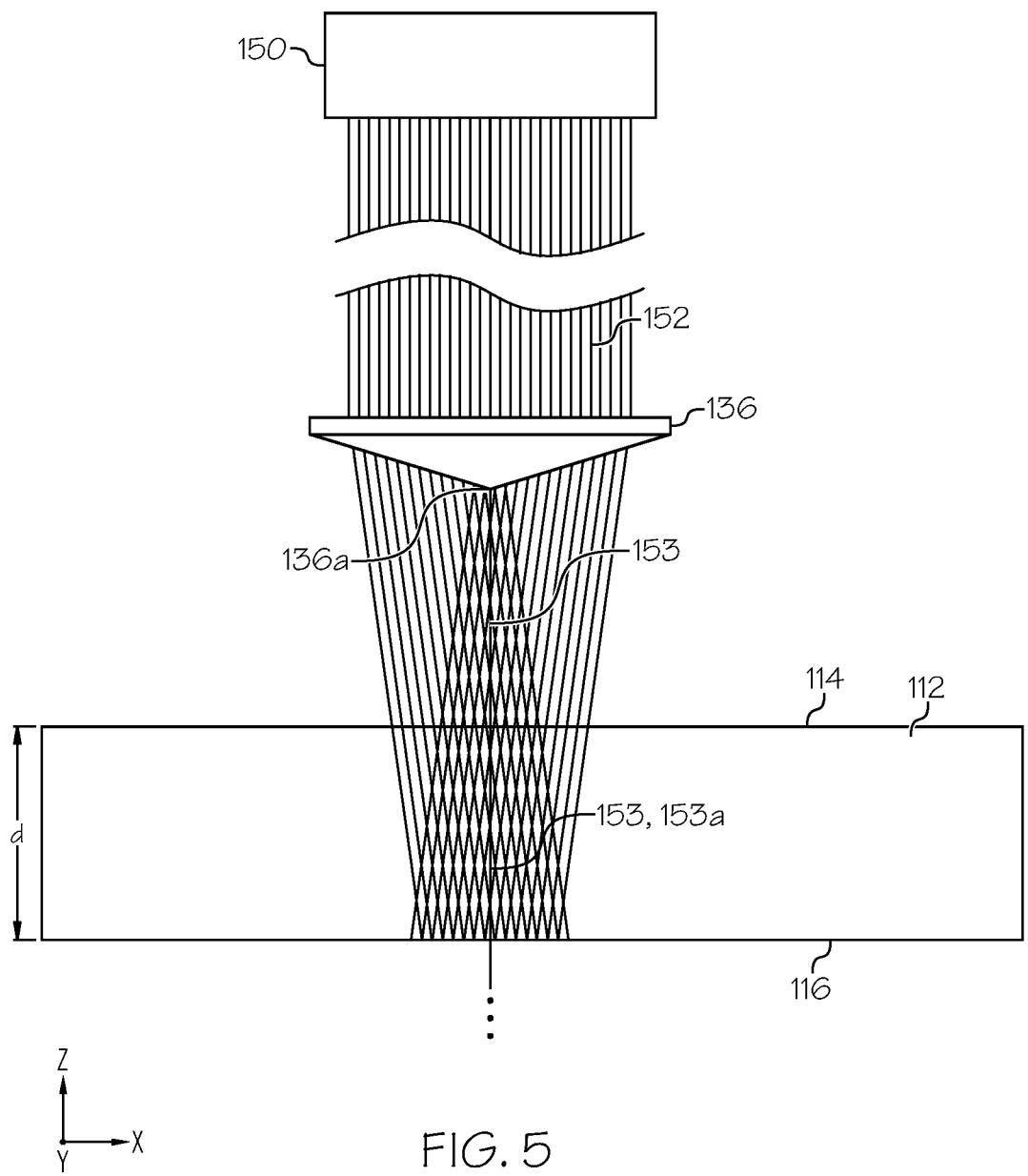
FIG. 5 schematically depicts another embodiment of an optical assembly for laser processing, according to one or more embodiments described herein.

FIG. 5 depicts another embodiment of an optical assembly 130. The basic construction follows the one described in FIG. 4A so that only the differences are described below. The depicted optical assembly 130 in FIG. 5 utilizes optics with a non-spherical free surface (e.g., aspheres) in order to generate the pulsed laser beam focal line 153. In FIG. 5, for example, a so-called conical prism, also referred to as axicon (e.g., an axicon 136), is used. In other embodiments, a waxicon or other non-spherical optic may be used. An axicon is a conically cut lens which forms a spot source on a line along the optical axis (or transforms a laser beam into a ring). The cone angle of the axicon 136 may be between about 5° and about 25°, for example, 10°, 15°, 20°, or the like. The apex 136a of the axicon 136 is directed in the beam propagation direction, for example, toward the transparent workpiece 112, and is centered on the beam center of the pulsed laser beam 152. Since the pulsed laser beam focal line 153 produced by the axicon 136 starts within the interior of the axicon 136, the transparent workpiece 112 (here aligned perpendicularly to the main beam axis) may be positioned in the beam pathway 151 directly behind the axicon 136.

As FIG. 5 shows, it is also possible to shift the transparent workpiece 112 along the beam pathway 151 due to the optical characteristics of the axicon 136 while remaining within the range of the pulsed laser beam focal line 153. The section of the induced absorption 153a in the material of the transparent workpiece 112 therefore extends over the entire workpiece depth d. However, the depicted layout may be subject to the following restrictions: since the region of the pulsed laser beam focal line 153 formed by axicon 136 begins within axicon 136, a significant part of the laser energy is not focused into the section of the pulsed laser beam focal line 153 that is located within the material of the transparent workpiece 112 (e.g., the portion 153a), in the situation where there is a separation between axicon 136 and the transparent workpiece 112. Furthermore, length l of the pulsed laser beam focal line 153 is related to the beam diameter through the refractive indices and cone angles of axicon 136. This is why, in the case of relatively thin materials (e.g., several millimeters), the total pulsed laser beam focal line 153 is much longer than the depth of the transparent workpiece 112, having the effect that much of the laser energy is not focused in the depth of the material.

Figure 6:
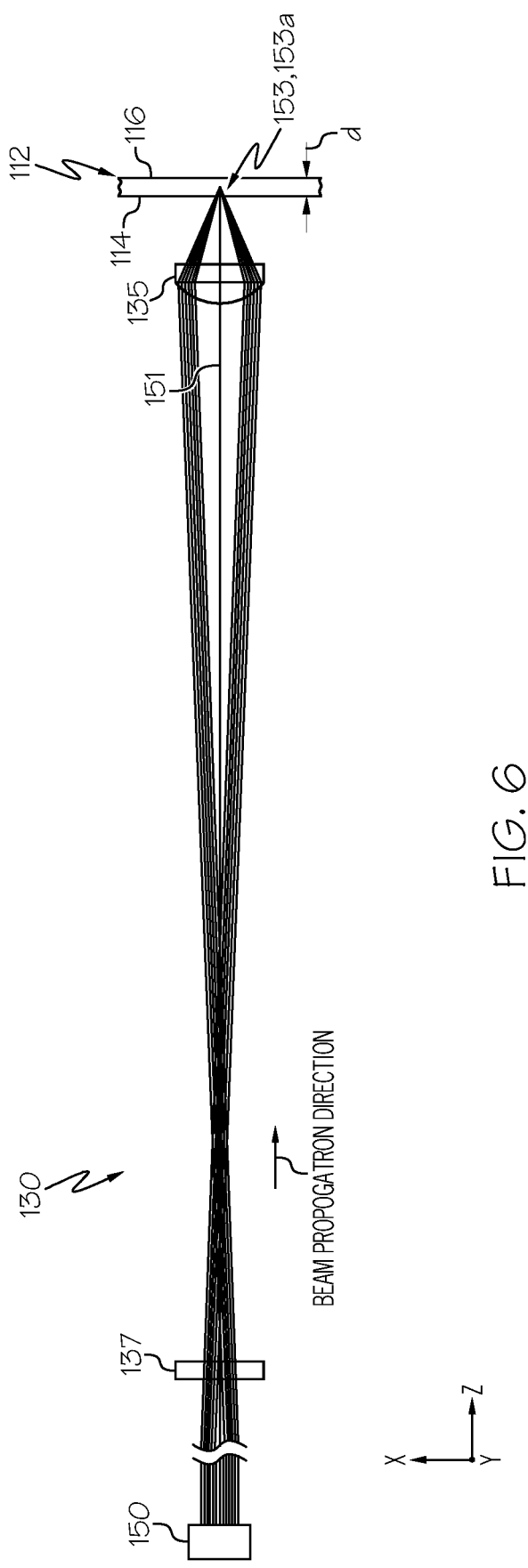
FIG. 6 schematically depicts another embodiment of an optical assembly for laser processing, according to one or more embodiments described herein.

For this reason, it may be desirable to use an optical assembly 130 that includes both an axicon and a focusing lens. FIG. 6 depicts such an optical assembly 130 in which a first optical element with a non-spherical free surface designed to form the pulsed laser beam focal line 153 is positioned in the beam path from the beam source 150. In the case shown in FIG. 6, this first optical element is an axicon 137 positioned perpendicularly to the beam direction and centered on beam from the beam source 150. The apex of the axicon 137 is oriented towards the beam direction. A second, focusing optical element, here the plano-convex lens 135 (the curvature of which is oriented towards the axicon), is positioned in the beam direction. In another embodiment, instead of the plano-convex lens depicted in FIG. 6, it is also possible to use a focusing meniscus lens or another higher-order corrected focusing lens (e.g., an asphere, multi-lens system). Moreover, in some embodiments, the optical assembly 130 may further include a collimating lens, which may serve to tightly adjust the circular illumination of the focusing lens 135.

Referring again to FIGS. 2-6, the beam source 150 may comprise any known or yet to be developed beam source 150 configured to output pulsed laser beams 152. Moreover, the beam source 150 may be housed within or optically coupled to a pivotable laser output head 140 such that the pulsed laser beam propagates along the beam pathway 151 between the pivotable laser output head 140 and the transparent workpiece 112. In operation, the defects 105 of the contour line 102 are produced by interaction of the transparent workpiece 112 with the pulsed laser beam 152 output by the beam source 150. In some embodiments, the beam source 150 may output a pulsed laser beam 152 comprising a wavelength of for example, 1064 nm, 1030 nm, 532 nm, 530 nm, 355 nm, 343 nm, or 266 nm, or 215 nm. Further, the pulsed laser beam 152 used to form defects 105 in the transparent workpiece 112 may be well suited for materials that are transparent to the selected pulsed laser wavelength.

Suitable laser wavelengths for forming defects 105 are wavelengths at which the combined losses of absorption and scattering by the transparent workpiece 112 are sufficiently low. In embodiments, the combined losses due to absorption and scattering by the transparent workpiece 112 at the wavelength are less than 20%/mm, or less than 15%/mm, or less than 10%/mm, or less than 5%/mm, or less than 1%/mm, where the dimension "/mm" means per millimeter of distance within the transparent workpiece 112 in the direction of propagation of the pulsed laser beam 152 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined absorption and scattering loss requirement for a given substrate material can also be used.

Further, the beam source 150 may output a pulsed laser beam 152 having a pulse energy of from about 25 µJ to about 1500 µJ, for example 100 µJ, 200 µJ, 250 µJ, 300 µJ, 400 µJ, 500 µJ, 600 µJ, 700 µJ, 750 µJ, 800 µJ, 900 µJ, 1000 µJ, 1100 µJ, 1200 µJ, 1250 µJ, 1300 µJ, 1400 µJ or the like. The beam source 150 may also be adjustable such that the beam source 150 may output pulsed laser beams 152 comprising various pulse energies. In operation, when the pulsed laser beam 152 is focused into the pulsed laser beam focal line 153, the pulsed laser beam focal line 153 may also comprise a pulse energy of from about 25 uJ to about 1500 uJ.

In operation, the pulsed laser beam 152 output by the beam source 150 may create multi-photon absorption (MPA) in the transparent workpiece 112. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

In some embodiments, the pulse duration of the individual pulses of the pulsed laser beam 152 is in a range of from about 1 picosecond to about 100 picoseconds, such as from about 5 picoseconds to about 20 picoseconds, and the repetition rate of the individual pulses may be in a range from about 1 kHz to 4 MHz, such as in a range from about 10 kHz to about 3 MHz, or from about 10 kHz to about 650 kHz. In addition to a single pulse operation at the aforementioned individual pulse repetition rates, the pulses may be produced in bursts of two pulses or more (such as, for example, 3 pulses, 4 pulses, 5 pulses, 10 pulses, 15 pulses, 20 pulses, or more per pulse burst, such as from 1 to 30 pulses per pulse burst, or from 5 to 20 pulses per pulse burst). The pulses within the burst may be separated by a duration that is in a range from about 1 nsec to about 50 nsec, for example, from about 10 nsec to about 30 nsec, such as about 20 nsec. In other embodiments, the pulses within the burst may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ between adjacent pulses within a burst 500 may be relatively uniform (e.g., within about 10% of one another). For example, in some embodiments, each pulse within a burst is separated in time from the subsequent pulse by approximately 20 nsec (50 MHz). For example, the time between each burst of pulses may be from about 0.25 microseconds to about 1000 microseconds, e.g., from about 1 microsecond to about 10 microseconds, or from about 3 microseconds to about 8 microseconds.

In some of the exemplary embodiments of the beam source 150 described herein, the time separation $T_b$ is about 5 microseconds for the beam source 150 outputting a pulsed laser beam 152 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 kHz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition frequency may be in a range of from about 1 kHz to about 2 MHz, such as from about 1 kHz to about 200 kHz. Bursting or producing pulse bursts is a type of laser operation where the emission of pulses is not in a uniform and steady stream but rather in tight clusters of pulses. The pulse burst laser beam may have a wavelength selected based on the material of the transparent workpiece 112 being operated on such that the material of the transparent workpiece 112 is substantially transparent at the wavelength. The average laser power per burst measured at the material may be at least about 40 µJ per mm of depth of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 112 may be described in terms of the burst energy (i.e., the energy contained within a burst where each burst contains a series of pulses), or in terms of the energy contained within a single laser pulse (many of which may comprise a burst). The energy per burst may be from about 25 µJ to about 1500 µJ, e.g., from about 50 µJ to about 500 µJ, or from about 50 µJ to about 250 µJ. For some glass compositions, the energy per burst may be from about 100 µJ to about 250 µJ. However, for display or TFT glass compositions, the energy per burst may be higher (e.g., from about 300 µJ to about 500 µJ, or from about 400 µJ to about 600 µJ, depending on the specific glass composition of the transparent workpiece 112). The use of a pulsed laser beam 152 capable of generating such bursts is advantageous for cutting or modifying transparent materials, for example glass. In contrast with the use of single pulses spaced apart in time by the repetition rate of the single-pulsed laser, the use of a burst sequence that spreads the laser energy over a rapid sequence of pulses within the burst allows access to larger timescales of high intensity interaction with the material than is possible with single-pulse lasers.

Figure 7B:
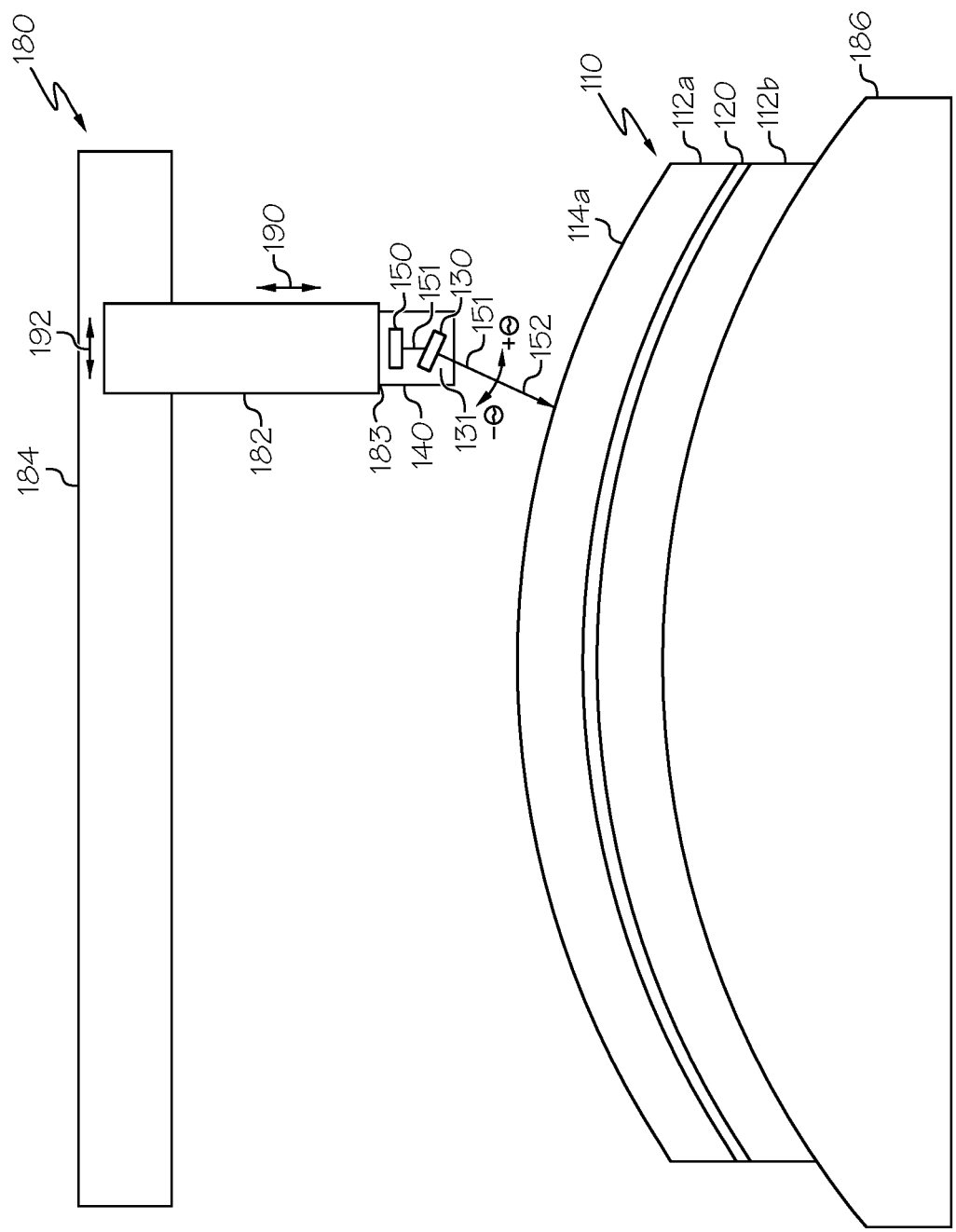
FIG. 7B schematically depicts another embodiment of a workpiece manufacturing system for laser processing a laminate workpiece stack, according to one or more embodiments described herein.

Referring now to FIGS. 7A and 7B a workpiece manufacturing system 180 is schematically depicted. The workpiece manufacturing system 180 provides 4 or more axes of relative motion between the laminate workpiece stack 110 and the pulsed laser beam 152 such that the laminate workpiece stack 110 may be laser processed and separated along a desired line of separation, such as the desired perimeter 119. In some embodiments, the workpiece manufacturing system 180 is a 4-6 axis CNC machine that provides range of relative motion between the pulsed laser beam 152 and the laminate workpiece stack 110 in each of a +/−X direction, a +/−Y direction, a +/−Z direction and at least one angular direction, for example, a +/−θ direction.

The workpiece manufacturing system 180 comprises a first translation arm 182, a second translation arm 184, and a translation table 186. As depicted in FIGS. 7A and 7B, the translation table 186 provides a location for the laminate workpiece stack 110 to be positioned during the laser processing operations described herein. In arcuate embodiments, the laminate workpiece stack 110 may be positioned on the translation table 186 convex up. Further, the translation table 186 may include a curved shape to account for the arcuate shape of the laminate workpiece stack 110. The translation table 186 may be positioned below (e.g., in the −Z direction) both the first translation arm 182 and the second translation arm 184. Further, the pivotable laser output head 140 may be coupled to the first translation arm 182, for example, an end 183 of the first translation arm 182, such that the pulsed laser beam 152 may propagate from the pivotable laser output head 140 toward the laminate workpiece stack 110 along the beam pathway 151.

In some embodiments, the first translation arm 182 is movably coupled to the second translation arm 184. In operation, the first translation arm 182 may move laterally in the X-direction along the second translation arm 184 to translate the pivotable laser output head 140 and the pulsed laser beam 152 relative the laminate workpiece stack 110. Further, the first translation arm 182 may move vertically in the Z-direction along the second translation arm 184 to change the vertical location of the pivotable laser output head 140, such that the vertical position of the pulsed laser beam focal line 153 may be altered. The translation table 186 and the second translation arm 184 are also translatable. In some embodiments, the second translation arm 184 may translate in the +/−Z direction (e.g., up and down as depicted in FIGS. 7A and 7B) and may translate in the +/−Y direction (e.g., into and out of the page as depicted in FIGS. 7A and 7B). Moreover, in some embodiments, the translation table 186 may translate in any of the X-direction (e.g., left and right as depicted in FIGS. 7A and 7B) the +/−Z direction (e.g., up and down as depicted in FIGS. 7A and 7B) and the +/−Y direction (e.g., into and out of the page as depicted in FIGS. 7A and 7B). In some embodiments, the relative translation speed of the pivotable laser output head 140 and the laminate workpiece stack 110 using the workpiece manufacturing system 180 may be less than about 5 m/s, for example, 4 m/s, 3 m/s, 2 m/s, 1 m/s, 0.5 m/s, 0.1 m/s, or the like.

As depicted in FIG. 7A, the pivotable laser output head 140 may be pivotably coupled to the first translation arm 182 using the pivot joint 142 such that the pivotable laser output head 140 may move angularly relative to the laminate workpiece stack 110 in the +/−θ direction. In some embodiments, as depicted in FIG. 7B, the optical assembly 130 positioned within the pivotable laser output head 140 may include the pivotable optical component 131, such as a beam steering mirror. In this embodiment, the pivotable laser output head 140 may be coupled to the first translation arm 182 without using the pivot joint 142 and the pivotable optical component 131 may control the angular direction of the beam pathway 151 and the pulsed laser beam 152. In other embodiments, the translation table 186 may be configured to move angularly in the +/−θ direction.

Figure 8A:
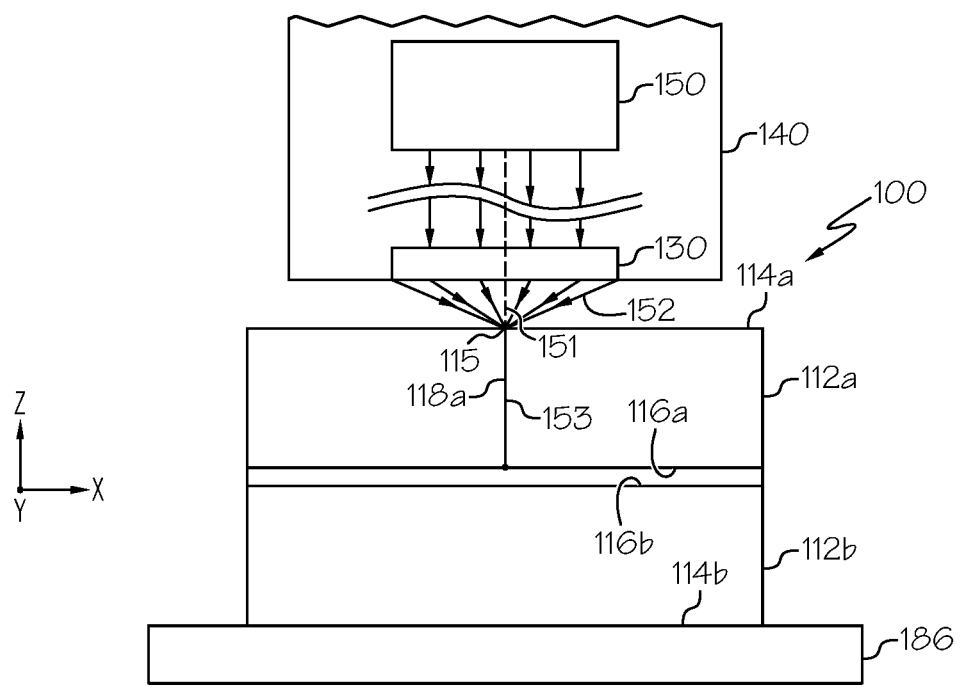
FIG. 8A schematically depicts a laminate workpiece stack undergoing laser processing, according to one or more embodiments described herein.

Referring now to FIG. 8A-8E, one method of laser processing the laminate workpiece stack 110 to separate the laminate workpiece stack 110 is schematically depicted. While the laminate workpiece stack 110 depicted in FIGS. 8A-8E is planar, the following method steps may be used to separate an arcuate laminate workpiece stack 110. First, as depicted in FIG. 8A, the method includes positioning the laminate workpiece stack 110 such that the first transparent workpiece 112a is located upstream the second transparent workpiece 112b along the beam pathway 151 (e.g., such that the impingement location 115 is located on the outward facing surface 114a of the first transparent workpiece 112a). Further, the method includes positioning the beam pathway 151 orthogonal the outward facing surface 114a of the first transparent workpiece 112a at the impingement location 115.

Next, the method includes separating the first transparent workpiece 112a along a first transparent workpiece separation line 118a. In some embodiments, for example, when the laminate workpiece stack 110 comprises a vehicle windshield, the first transparent workpiece separation line 118a may correspond with the desired perimeter 119 of the laminate workpiece stack 110. Separating the first transparent workpiece 112a may comprise focusing the pulsed laser beam focal line 153 into the first transparent workpiece 112a to generate an induced absorption within the first transparent workpiece 112a such that the induced absorption produces the defect 105 within the first transparent workpiece 112a. The pulsed laser beam focal line 153 may be focused into the first transparent workpiece 112a orthogonal to the outward facing surface 114a at the impingement location 115. Further, the pulsed laser beam focal line 153 may be positioned such that the pulsed laser beam focal line 153 extends within at least a portion of the depth of the first transparent workpiece 112a without extending into the resin layer 120. For example, the pulsed laser beam focal line 153 may extend within the first transparent workpiece 112a from the outward facing surface 114a to the inward facing surface 116a. In operation, the position of pulsed laser beam focal line 153 may be controlled by suitably positioning and/or aligning the pulsed laser beam 152 relative to the transparent workpiece 112 as well as by suitably selecting the parameters of the optical assembly 130 and the workpiece manufacturing system 180.

Figure 8B:
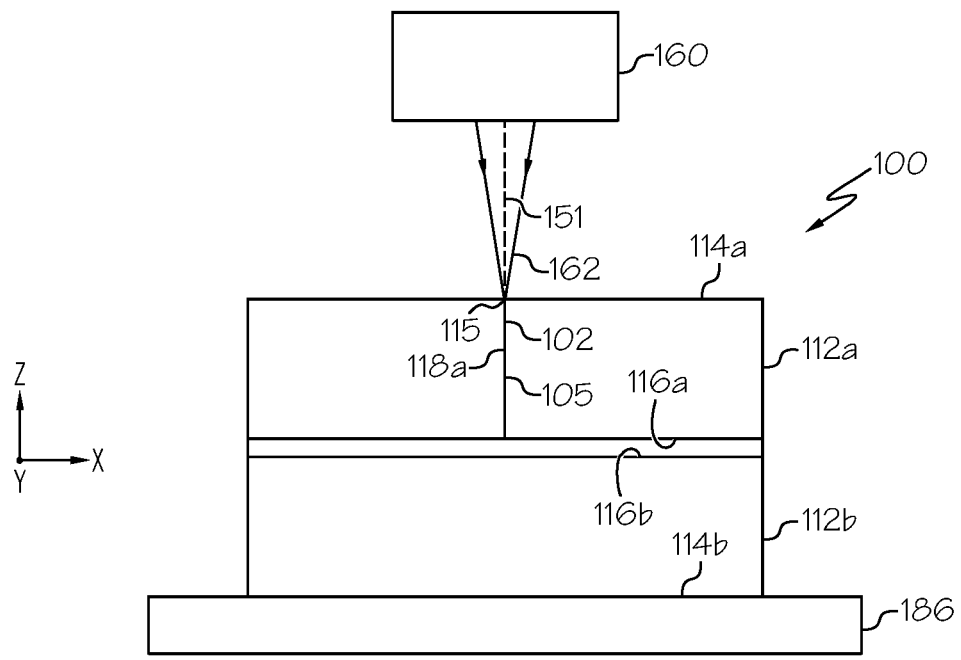
FIG. 8B schematically depicts the laminate workpiece stack of FIG. 8A undergoing additional laser processing, according to one or more embodiments described herein.

Referring now to FIGS. 8A and 8B, the method further comprises translating the laminate workpiece stack 110 relative the pulsed laser beam focal line 153 (or the pulsed laser beam focal line 153 may be translated relative to the laminate workpiece stack 110) to form the contour line 102 comprising the plurality of defects 105 along the first transparent workpiece separation line 118a. In embodiments in which the laminate workpiece stack 110 is arcuate, the pulsed laser beam focal line 153 may also be angularly translated relative to the outward facing surface 114 to retain orthogonality with the outward facing surface 114a, for example, using the pivotable laser output head 140 and/or the pivotable optical component 131. Further, in these arcuate embodiments, the pulsed laser beam focal line 153 may also be translated vertically relative to the laminate workpiece stack 110 (e.g., in the +/−Z direction) such that the pulsed laser beam focal line 153 remains within the first transparent workpiece 112a without irradiating the resin layer 120. Moreover, in these arcuate embodiments, the pulse frequency of the pulsed laser beam 152 output by the beam source 150, the relative translation speed of the pulsed laser beam 152 with respect to the laminate workpiece stack 110, or both, may be variable as the laminate workpiece stack 110 translates relative the pulsed laser beam focal line 153, such that the resultant defects 105 formed in the first transparent workpiece 112a are uniformly spaced along the contour line 102.

Referring still to FIGS. 8A and 8B, the first transparent workpiece 112a may separate along the first transparent workpiece separation line 118a either spontaneously, by self-propagation, or in response to a subsequently applied stressor. In embodiments in which the first transparent workpiece 112a comprises a strengthened glass substrate, such as an ion-exchanged glass substrate or a thermally tempered glass substrate, a crack between the plurality of defects 105 of the contour line 102 may spontaneously self-propagate to separate the first transparent workpiece 112a along the first transparent workpiece separation line 118a. Further, in embodiments in which the first transparent workpiece 112a comprises a non-strengthened glass substrate, such as non-strengthened soda lime glass, the first transparent workpiece 112a may be subsequently stressed using a stress inducing source, such as a mechanical or thermal source.

For example, as depicted in FIG. 8B, the infrared beam source 160 may direct the infrared laser beam 162 along or adjacent the contour line 102 to induce separation of the first transparent workpiece 112a along the first transparent workpiece separation line 118a. Further, in some embodiments, the subsequent stressor applied to the contour line 102 may comprise directing a second pulsed laser beam focal line into the first transparent workpiece 112a at a location along or near the contour line 102 and translating the laminate workpiece stack 110 and the second pulsed laser beam focal line relative to each other along or near the contour line 102, thereby separating the first transparent workpiece 112a along the first transparent workpiece separation line 118a. Further, the second pulsed laser beam focal line comprises a greater pulse energy than the pulsed laser beam focal line 153 (e.g., a first pulsed laser beam focal line). In operation, the second pulsed laser beam focal line may be generated by outputting a pulsed laser beam 152 having a higher pulse energy than the pulsed laser beam 152 used to form the contour line 102. This higher pulse energy may be achieved by adjusting the beam source 150 (e.g., by increasing the power output of the beam source 150).

Figure 8C:
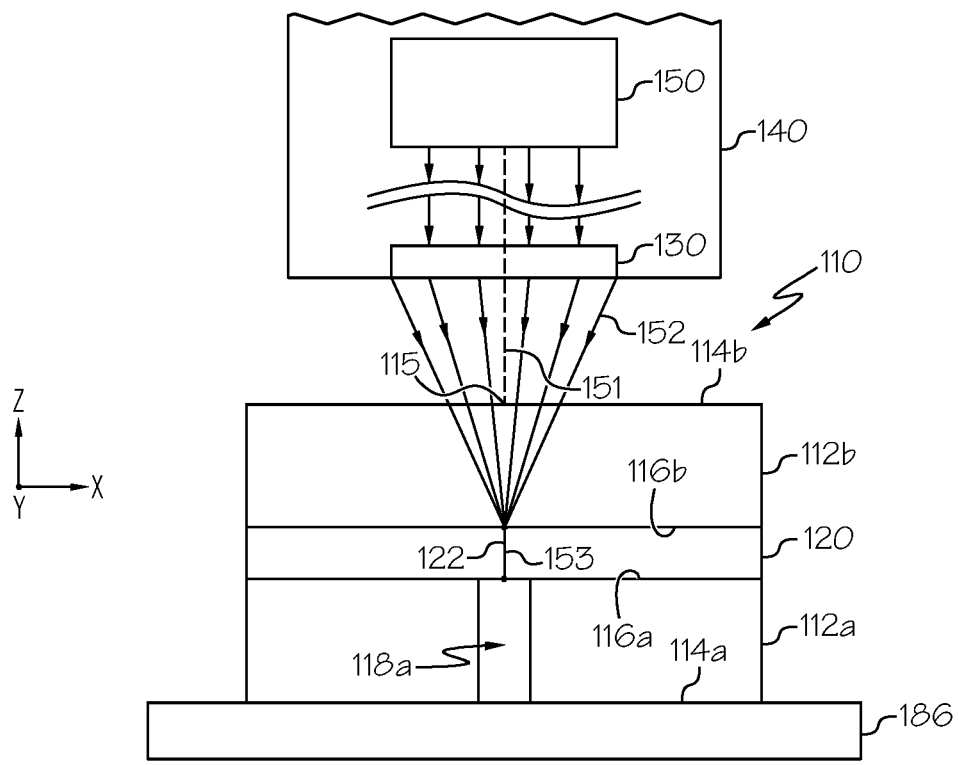
FIG. 8C schematically depicts the laminate workpiece stack of FIG. 8B undergoing additional laser processing, according to one or more embodiments described herein.

Referring now to FIG. 8C, the method may further comprise positioning (e.g., repositioning) the laminate workpiece stack 110 such that the first transparent workpiece 112a is positioned downstream the second transparent workpiece 112b along the beam pathway 151 (e.g., such that the impingement location 115 is located on the outward facing surface 114b of the second transparent workpiece 112b). In some embodiments, this repositioning may comprise changing the orientation of the pivotable laser output head 140 such that the pivotable laser output head 140 faces the second transparent workpiece 112b or changing the orientation of the laminate workpiece stack 110 (e.g., flipping the laminate workpiece stack 110) such that the pivotable laser output head 140 faces the second transparent workpiece 112b. Further, the method includes positioning the beam pathway 151 orthogonal the outward facing surface 114b of the second transparent workpiece 112b at the impingement location 115.

Next, referring still to FIG. 8C, the resin layer 120 may be separated along a resin separation line 122 by laser ablation. For example, the resin layer 120 may be separated by focusing the pulsed laser beam focal line 153 into the resin layer 120 and translating the laminate workpiece stack 110 relative to the pulsed laser beam focal line 153 to ablate the resin material of the resin layer 120 along the resin separation line 122 and separate the resin layer 120 along the resin separation line 122. To ablate the resin layer 120, the optical assembly 130 and the beam source 150 may be configured to focus the pulsed laser beam focal line 153 into the resin layer 120. The resin layer 120 may be thinner than each of the first and second transparent workpieces 112a, 112b, thus the length of the pulsed laser beam focal line 153 may be shortened. For example, the pulsed laser beam focal line 153 may be positioned within the laminate workpiece stack 110 such that the pulsed laser beam focal line 153 extends through the resin layer 120, from the inward facing surface 116a of the first transparent workpiece 112a to the inward facing surface 116b of the second transparent workpiece 112b.

Further, the pulse energy of the pulsed laser beam focal line 153 (e.g., the burst energy in embodiments in which the pulsed laser beam 152 is output in bursts) may be different during ablation of the resin layer 120 than during the formation of the plurality of defects 105 in the first and second transparent workpieces 112a, 112b. For example, the pulse energy during laser ablation of the resin layer 120 may comprise an energy per burst may be from about 100 µJ to about 1500 µJ, for example, 250 µJ, 500 µJ, 750 µJ, 800 µJ, 1000 µJ, 1250 µJ or the like. As one example, during laser ablation of the resin layer 120, the beam source 150 may output a pulsed laser beam 152 comprising a 532 nm wavelength at a burst repetition rate of about 200 kHz and a pulse energy of about 800 µJ. In operation, the pulse energy output by the pulsed laser beam 152 when laser ablating the resin layer 120 may be more than the pulse energy output by the pulsed laser beam 152 when forming defects 105 in the transparent workpiece 112.

Next, the laminate workpiece stack 110 may be translated relative to the pulsed laser beam focal line 153 (or the pulsed laser beam focal line 153 may be translated relative to the laminate workpiece stack 110) to ablate the resin layer 120 material along the resin separation line 122. The relative translation speed of the laminate workpiece stack 110 and the pulsed laser beam focal line 153 as well as the repetition rate of the pulsed laser beam 152 may be configured such that each pulse of the pulsed laser beam focal line 153 is separated along the resin separation line 122 by a distance less than or equal to the diameter of the pulsed laser beam focal line 153. In this configuration, there is little to no separation between the pulses of the pulsed laser beam focal line along the resin separation line 122, allowing the pulsed laser beam focal line 153 to ablate a continuous line of material of the resin layer 120 along the resin separation line 122. Thus, as the pulsed laser beam focal line 153 translates along the resin separation line 122, the pulsed laser beam focal line 153 may irradiate and ablate iterative portions of the resin layer 120, for example a first portion of the resin layer 120 adjacent to a second portion of the resin layer 120 along the resin separation line 122. In some embodiments, the first portion of the resin layer 120 may overlap the adjacent, second portion of the resin layer 120. In other embodiments, the first portion of the resin layer 120 may be spaced apart from the second portion of the resin layer 120 by about 2 µm or less, for example, about 1.5 µm, 1 µm, 0.5 µm, 0.25 µm, 0.1 µm, or the like.

While not intending to be limited by theory, separating the first transparent workpiece 112a prior to separating the resin layer 120 allows the crack along the first transparent workpiece separation line 118a to provide an exit pathway for ablated resin material of the resin layer 120, preventing the ablated resin material from damaging the first transparent workpiece 112a or the second transparent workpiece 112b. Moreover, repositioning the laminate workpiece stack 110, as described above, allows the pulsed laser beam 152 to traverse through an uncracked transparent workpiece (e.g., the second transparent workpiece 112b) before reaching the resin layer 120. This allows the pulsed laser beam 152 to be more readily controlled as the material-air interface of the crack along the first transparent workpiece separation line 118a may alter the pulsed laser beam 152 and the pulsed laser beam focal line 153 in a non-uniform or otherwise difficult to control manner, hindering the ability to effectively ablate the resin layer 120.

Figure 8D:
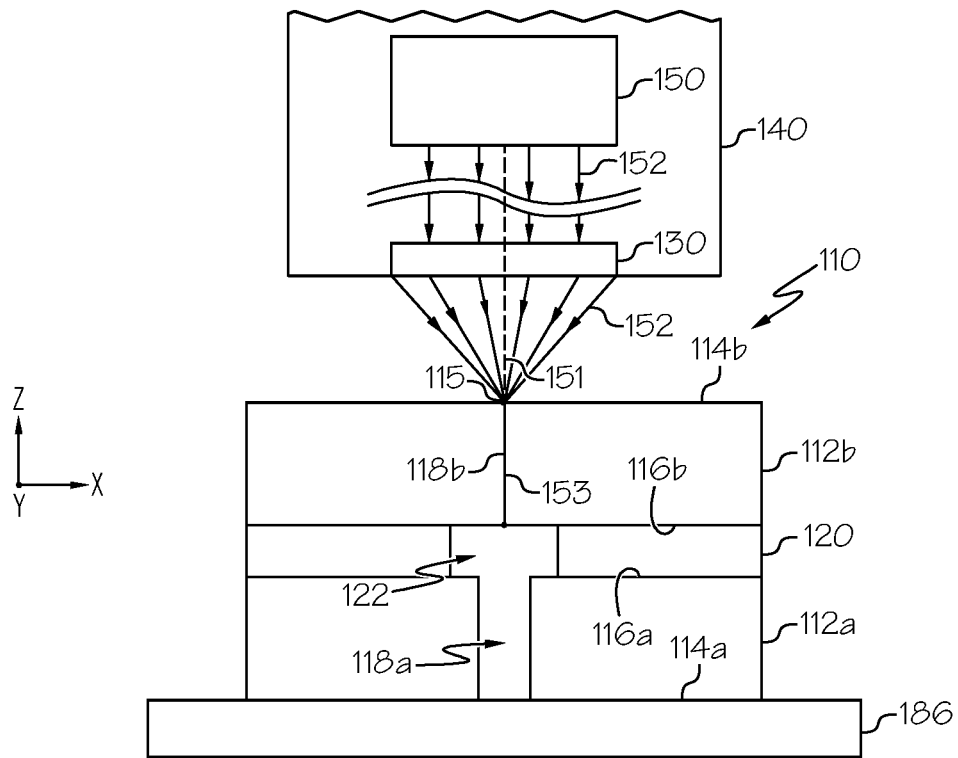
FIG. 8D schematically depicts the laminate workpiece stack of FIG. 8C undergoing additional laser processing, according to one or more embodiments described herein.
Figure 8E:
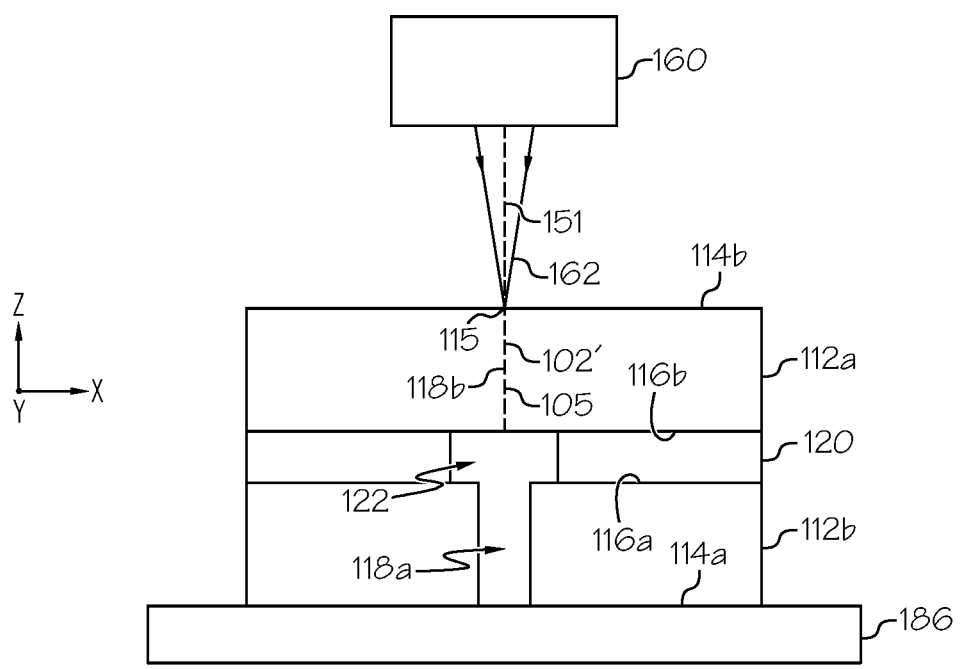
FIG. 8E schematically depicts the laminate workpiece stack of FIG. 8D undergoing additional laser processing, according to one or more embodiments described herein.

Referring now to FIGS. 8D and 8E, the second transparent workpiece 112b may be separated along a second transparent workpiece separation line 118b by focusing the pulsed laser beam focal line 153 into the second transparent workpiece 112b and translating the laminate workpiece stack 110 relative the pulsed laser beam focal line 153 to form a second contour line 102' comprising the plurality of defects 105 along the second transparent workpiece separation line 118b, for example, as described above with respect to the first transparent workpiece 112a and depicted in FIG. 7A. In embodiments in which the second transparent workpiece 112b comprises a non-strengthened glass substrate, for example, non-strengthened soda lime glass, the first transparent workpiece 112a may be subsequently stressed using a stress inducing source, such as a mechanical or thermal source. For example, as depicted in FIG. 8E, the infrared beam source 160 may direct the infrared laser beam 162 along or near the second contour line 102' to induce separation of the second transparent workpiece 112b along the second transparent workpiece separation line 118b. Further, in some embodiments, the subsequent stressor applied to the contour line 102 may comprise directing a second pulsed laser beam focal line 153 into the first transparent workpiece 112a at a location along or near the second contour line 102'. Moreover, in embodiments in which the second transparent workpiece 112b comprises a strengthened glass substrate, such as an ion-exchanged glass substrate, or a thermally tempered glass substrate, a crack between the plurality of defects 105 of the contour line 102 may self-propagate due to separate the second transparent workpiece 112*b* along the second transparent workpiece separation line 118*b*.

Moreover, as depicted in FIGS. 8A-8E, the first transparent workpiece separation line 118*a*, the second transparent workpiece separation line 118*b*, and the resin separation line 122 are substantially aligned in a direction orthogonal to the outward facing surfaces 114*a*, 114*b* of the first and second transparent workpieces 112*a* and 112*b* at the impingement location 115. For example, the first transparent workpiece separation line 118*a*, the second transparent workpiece separation line 118*b*, and the resin separation line 122 may each correspond with the desired perimeter 119 (FIG. 1C).

Figure 9A:
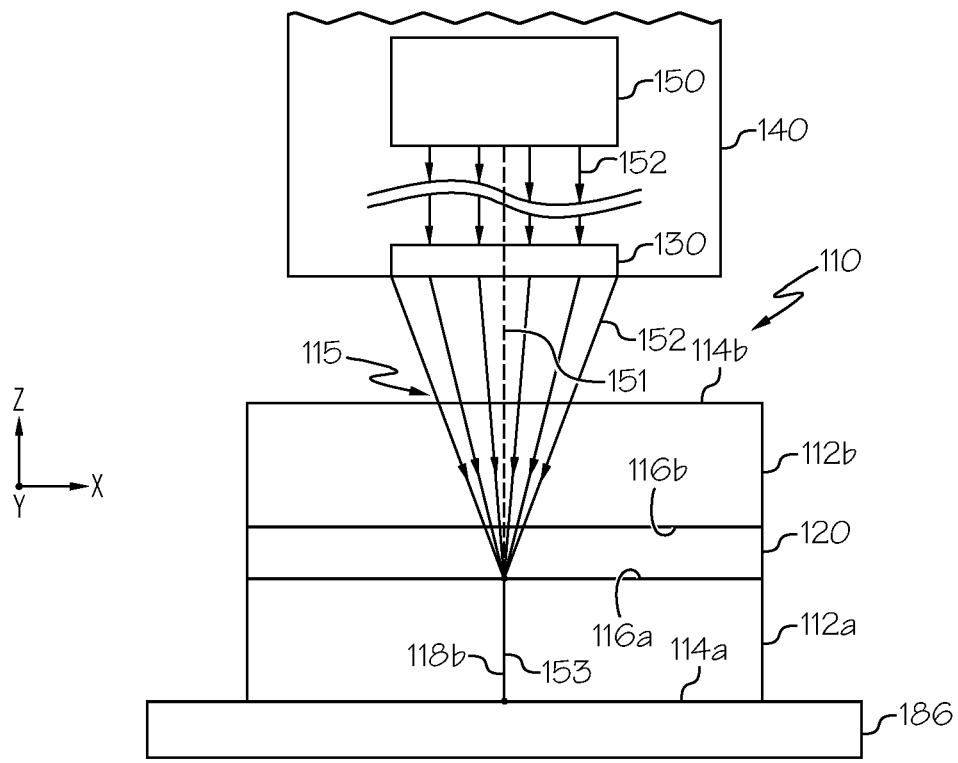
FIG. 9A schematically depicts another laminate workpiece stack undergoing laser processing, according to one or more embodiments described herein.
Figure 9B:
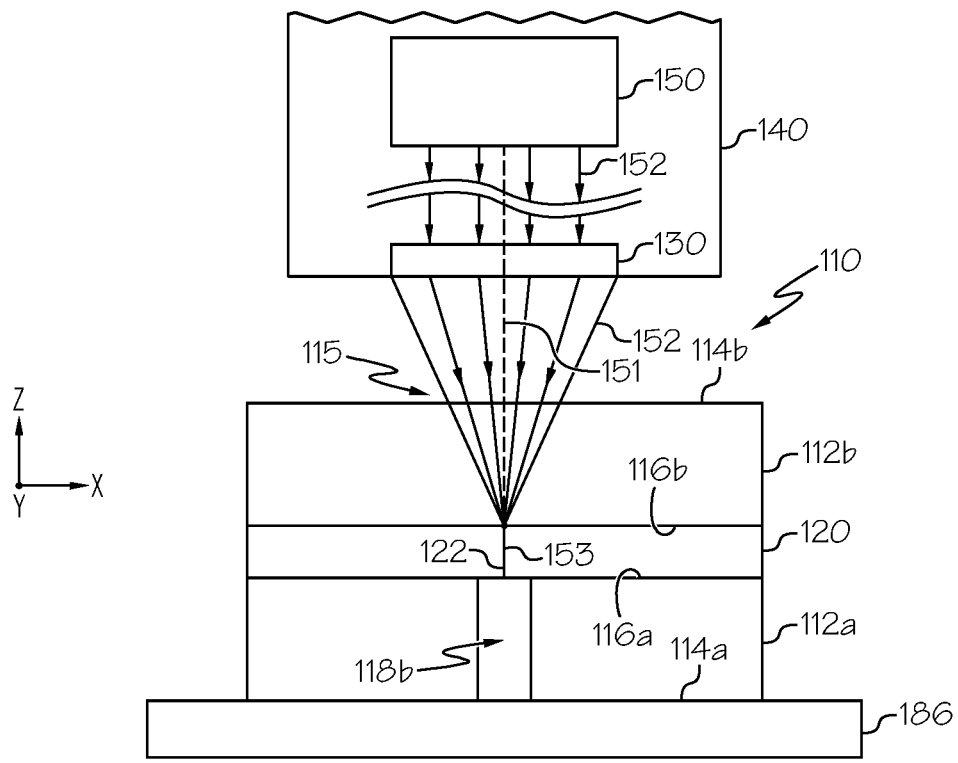
FIG. 9B schematically depicts the laminate workpiece stack of FIG. 9A undergoing additional laser processing, according to one or more embodiments described herein.

Referring now to FIGS. 9A-9D, another method of processing the laminate workpiece stack 110 is depicted. In this embodiment, the first transparent workpiece 112*a* comprises a strengthened glass substrate, for example, a thermally tempered glass substrate or an ion-exchanged glass substrate. As depicted in FIG. 9A, the method may first comprise positioning the laminate workpiece stack 110 relative to the beam pathway such that the first transparent workpiece 112*a* is located downstream the second transparent workpiece 112*b* (e.g., such that the impingement location 115 is located on the outward facing surface 114*b* of the second transparent workpiece 112*b*). Further, the method includes positioning the beam pathway 151 orthogonal the outward facing surface 114*a* of the first transparent workpiece 112*a* at the impingement location 115.

Referring still to FIG. 9A, the method includes separating the first transparent workpiece 112*a* along the first transparent workpiece separation line 118*a* by focusing the pulsed laser beam focal line 153 into the first transparent workpiece 112*a* to generate an induced absorption within the first transparent workpiece 112*a* such that the induced absorption produces the defect 105 within the first transparent workpiece 112*a*, for example, as described above with respect to FIGS. 9A-9E. Separating the first transparent workpiece 112*a* further includes translating the laminate workpiece stack 110 relative the pulsed laser beam focal line 153 to form the contour line 102 comprising the plurality of defects 105 along the first transparent workpiece separation line 118*a*. Because the first transparent workpiece 112*a* comprises a strengthened glass substrate, a crack between the plurality of defects 105 of the contour line 102 may self-propagate and separate the first transparent workpiece 112*a* along the first transparent workpiece separation line 118*a*.

Referring now to FIG. 9B, the resin layer 120 may next be separated along the resin separation line 122 by focusing the pulsed laser beam focal line 153 into the resin layer 120 and translating the laminate workpiece stack 110 relative to the pulsed laser beam focal line 153 to ablate the resin material of the resin layer 120 along the resin separation line 122 to separate the resin layer 120 along the resin separation line 122, using the methods described above with respect to FIG. 9B. By separating the first transparent workpiece 112*a* prior to separating the resin layer 120, the crack in the first transparent workpiece 112*a* provides an exit pathway for ablated resin material of the resin layer 120 preventing the ablated resin material from damaging the first transparent workpiece 112*a* or the second transparent workpiece 112*b*. Moreover, because the first transparent workpiece 112*a* comprises a strengthened glass substrate, the laminate workpiece stack 110 does not need to be repositioned relative the beam pathway because a crack may be formed in the first transparent workpiece 112*a* without a subsequent processing step, such as directing the infrared laser beam 162 along the contour line 102. In the orientation depicted in FIGS. 10A and 10B, the infrared laser beam 162 would be absorbed by the second transparent workpiece 112*b*. Thus, if the first transparent workpiece 112*a* was a non-strengthened glass substrate in this setup, the infrared laser beam 162 would be unable to reach the first transparent workpiece 112*a*.

Figure 9C:
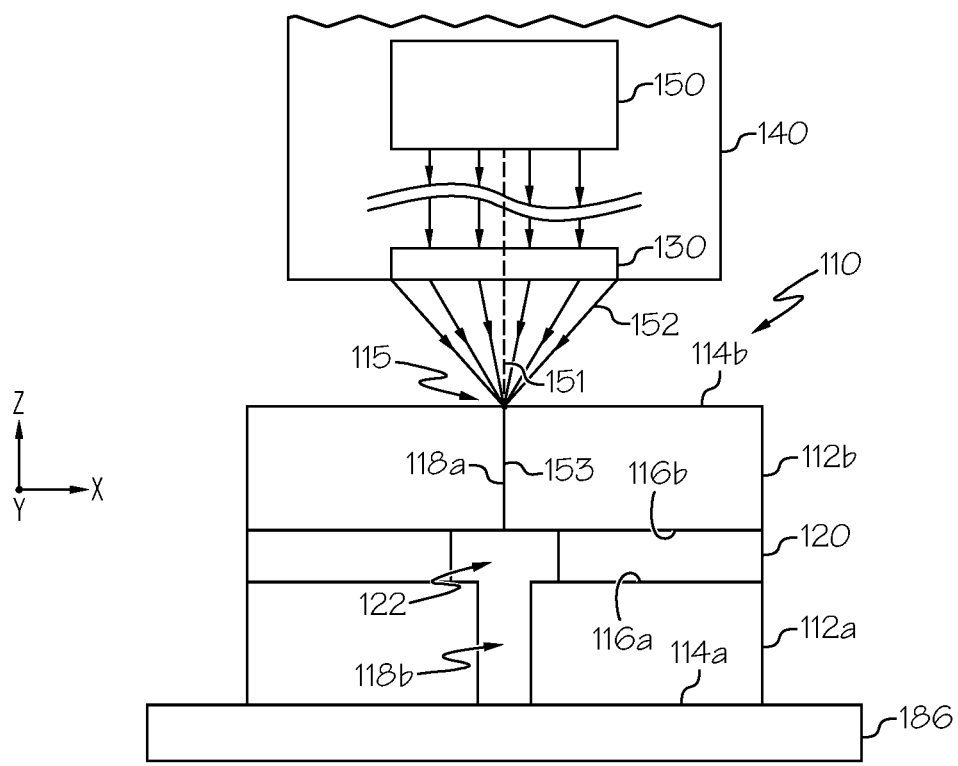
FIG. 9C schematically depicts the laminate workpiece stack of FIG. 9B undergoing additional laser processing, according to one or more embodiments described herein.
Figure 9D:
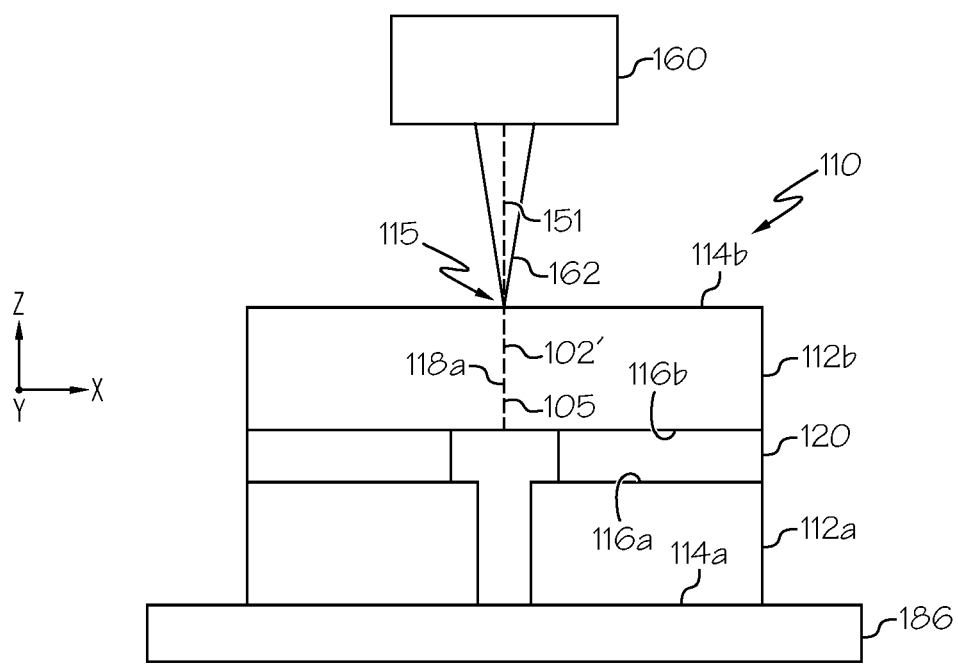
FIG. 9D schematically depicts the laminate workpiece stack of FIG. 9C undergoing additional laser processing, according to one or more embodiments described herein.

Referring now to FIGS. 9C and 9D, the method may further include separating the second transparent workpiece 112*b* along the second transparent workpiece separation line 118*b* by focusing the pulsed laser beam focal line 153 into the second transparent workpiece 112*b* and translating the laminate workpiece stack 110 relative the pulsed laser beam focal line 153 to form the second contour line 102' comprising the plurality of defects 105 along the second transparent workpiece separation line 118*b*. As depicted in FIG. 9D, in embodiments in which the second transparent workpiece 112*b* comprises a non-strengthened glass substrate, the second transparent workpiece 112*b* may be subsequently stressed using a stress inducing source, such as a mechanical or thermal source. For example, as depicted in FIG. 9D, the infrared beam source 160 may direct the infrared laser beam 162 along or adjacent the second contour line 102' to induce separation of the second transparent workpiece 112*b* along the second transparent workpiece separation line 118*b*. Further, a second pulsed laser beam focal line may be used to induce separation of the second transparent workpiece 112*b* along the second transparent workpiece separation line 118*b*. Moreover, in embodiments in which the second transparent workpiece 112*b* comprises a strengthened glass substrate, such as an ion-exchanged glass substrate, or a thermally tempered glass substrate, a crack between the plurality of defects 105 of the second contour line 102' may self-propagate due to stresses present in the strengthened glass of the second transparent workpiece 112*b* to separate the second transparent workpiece 112*b* along the second transparent workpiece separation line 118*b*.

Figure 10:
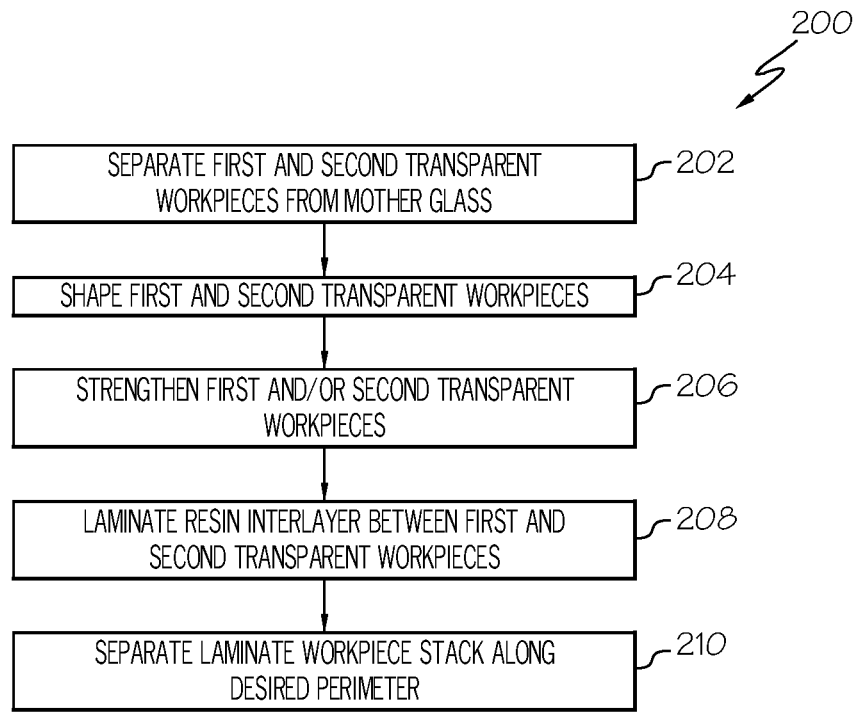
FIG. 10 depicts a flowchart of a method of forming a laminate workpiece stack, according to one or more embodiments described herein.

Referring now to FIG. 10, a flow chart 200 depicts a method of forming the laminate workpiece stack 110. The method depicted in FIG. 10 may be used for embodiments in which the laminate workpiece stack 110 comprises a vehicle windshield. The flow chart 200 depicts a number of method steps illustrated by steps 202-210. While the method is described in a particular order, it should be understood that other orders are contemplated. First, at step 202 the first transparent workpiece 112*a* and the second transparent workpiece 112*b* may be separated from a sheet of mother glass, for example, using the laser processing methods described above. Next, at step 204, each of the first transparent workpiece 112*a* and the second transparent workpiece 112*b* may be shaped into arcuate surfaces. For ease of understanding, the shaping process is described with respect to the first transparent workpiece 112*a*, however, it should be understood each of the first transparent workpiece 112*a* and the second transparent workpiece 112*b* may each be shaped in the following manner.

The first transparent workpiece 112*a* may be positioned on a ring mold such that only an outer perimeter of the first transparent workpiece 112*a* is in contact with the ring mold. In some embodiments, the ring mold may be a component of a shaping wagon (e.g., a sag wagon) such that the first transparent workpiece 112*a* may be more easily transported. Next, the first transparent workpiece 112*a* positioned on the ring mold is placed in a lehr oven to undergo a heating process. The lehr oven may comprise electrical heating elements. As the first transparent workpiece 112*a* heats, the glass material of the first transparent workpiece softens. When the glass material of the first transparent workpiece 112a reaches about 1E+8 poise, the first transparent workpiece 112a begins to relax and may contact the entire perimeter of the ring mold. The lehr oven may continue to heat the first transparent workpiece 112a such that the first transparent workpiece 112a reaches about 1E+12 poise and the center of the first transparent workpiece 112a sags to create a concave shape. In some embodiments, the center of the first transparent workpiece 112a will sag to an offset distance between the perimeter and the center of the first transparent workpiece 112a, measured in the direction the sag occurs, of from about 3 mm to about 50 mm. Further, in some embodiments, a mold having the desired shape of the first transparent workpiece 112a may contact the first transparent workpiece 112a to induce additional shaping.

Further, at step 206, the first transparent workpiece 112a and/or the second transparent workpiece 112b may optionally be strengthened using a thermal tempering process or an ion-exchange strengthening process. Next, at step 208, the resin layer 120 may be laminated (e.g., bonded) between the first transparent workpiece 112a and the second transparent workpiece 112b to form the laminate workpiece stack 110. The steps of the lamination process of step 208 are described in more detail in a flow chart 300 depicted in FIG. 11 and described below. Further, at step 210, the laminate workpiece stack 110 may be separated along the desired perimeter 119 of the laminate workpiece stack 110 using the methods of separating the laminate workpiece stack 110 described above with respect to FIGS. 8A-9D.

Figure 11:
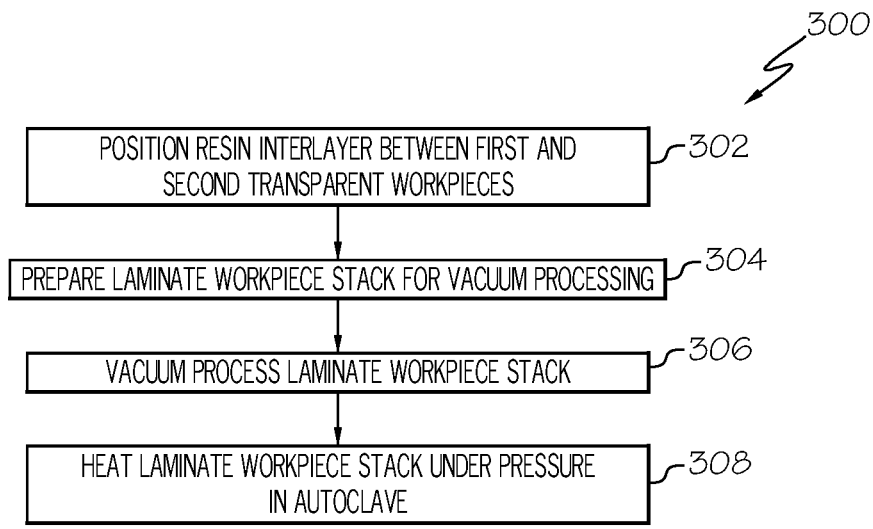
FIG. 11 depicts a flowchart of a method of laminating a resin layer between two transparent workpieces, according to one or more embodiments described herein.

Referring now to FIG. 11, the flow chart 300 depicts a method of laminating the resin layer 120 between the first transparent workpiece 112a and the second transparent workpiece 112b. In particular, the flow chart 300 provides a more detailed description of step 208 of the flow chart 200 of FIG. 10. The flow chart 300 depicts a number of method steps illustrated by steps 302-308. While the method is described in a particular order, it should be understood that other orders are contemplated. First, at step 302, the resin layer 120 is disposed between the inward facing surfaces 116a, 116b of the first transparent workpiece 112a and the second transparent workpiece 112b to form the laminate workpiece stack 110. Next, at step 304, the laminate workpiece stack 110 is prepared for vacuum processing by coupling a vacuum ring around the perimeter of the laminate workpiece stack 110 and/or positioning the laminate workpiece stack 110 in a vacuum bag.

At step 306, the laminate workpiece stack is vacuum processed. The vacuum processing of step 306 comprises setting an atmospheric environment for the laminate workpiece stack 110 that comprises a pressure below atmospheric pressure, for example, a pressure from about 0.5 bar to about 0.9 bar, for example, 0.6 bar, 0.7, bar, 0.8 bar, or the like for a period of between about 15-20 mins at about room temperature and subsequently heating the laminate workpiece stack 110 to a temperature of from about 35° C. to about 100° C., while retaining the previously set pressure. After vacuum processing, the laminate workpiece stack 110 may be removed from the vacuum bag and the vacuum ring may be removed from the laminate workpiece stack 110. Next, at step 308, the laminate workpiece stack 110 may be positioned within an autoclave pressure vessel and heated at a high pressure within the autoclave pressure vessel. For example, the laminate workpiece stack 110 may be heated under pressure (e.g., at a pressure atmospheric pressure) in the autoclave pressure vessel for about 35 to 40 mins, at a temperature of from about 125° C. to about 140° C., and at a pressure of from about 150 psi to about 200 psi, for example, about 160 psi, 170 psi, 180 psi, 190 psi, or the like.

After lamination, the laminate workpiece stack 110 may be separated along the desired perimeter 119 of the laminate workpiece stack 110 using the methods of separating the laminate workpiece stack 110 described in the embodiments herein to form a vehicle glass laminate, such as a vehicle windshield, that meets the tight dimensional tolerances of current and future vehicle manufacturing processes.

While the methods described herein primarily refer to the formation of laminate workpiece stacks 110 for vehicle windshields and vehicle manufacturing, it should be understood that the methods described herein may be applicable to any manufacturing process which includes the separation of any laminate workpiece stack that comprises a resin layer positioned between transparent workpieces. In view of the foregoing description, it should be understood that separation of laminate workpiece stacks, such as vehicle windshields, may be enhanced by utilizing a pulsed laser beam and laser processes such that each layer of the laminate workpiece may be separated with a high level of quality and precision.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example above, below, up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for laser processing a laminate workpiece stack, the method comprising:
    forming a contour line in a first transparent workpiece of a laminate workpiece stack comprising a resin layer disposed between the first transparent workpiece and a second transparent workpiece, wherein forming the contour line comprises:
        focusing a pulsed laser beam output by a beam source into a pulsed laser beam focal line oriented along a beam pathway and directed into the first transparent workpiece, the pulsed laser beam focal line generating an induced absorption within the first transparent workpiece; and
        translating the laminate workpiece stack and the pulsed laser beam focal line relative to each other along a first workpiece separation line, thereby laser forming the contour line comprising a plurality of defects along the first workpiece separation line;
    separating the first transparent workpiece along the first workpiece separation line;
    positioning the laminate workpiece stack such that the first transparent workpiece is located downstream the second transparent workpiece along the beam pathway subsequent to separating the first transparent workpiece along the first workpiece separation line; and
    separating the resin layer along a resin separation line, subsequent to positioning the laminate workpiece stack such that the first transparent workpiece is located downstream the second transparent workpiece along the beam pathway, wherein separating the resin layer comprises:
        focusing the pulsed laser beam into the pulsed laser beam focal line oriented along the beam pathway and directed into the resin layer; and
        translating the laminate workpiece stack and the pulsed laser beam focal line relative to each other along the resin separation line, thereby laser ablating the resin layer along the resin separation line.

2. The method of claim 1, wherein the resin layer comprises polyvinyl butyral, ethylene-vinyl acetate, or a combination thereof.

3. The method of claim 1, wherein:
    the laminate workpiece stack and the pulsed laser beam focal line are translated relative to each other along the resin separation line such that the pulsed laser beam focal line ablates a first portion of the resin layer prior to ablating and a second portion of the resin layer; and
    the first portion of the resin layer is adjacent the second portion of the resin layer along the resin separation line.

4. The method of claim 3, wherein the first portion of the resin layer overlaps the second portion of the resin layer.

5. The method of claim 3, wherein the first portion of the resin layer is spaced apart from the second portion of the resin layer along the resin separation line by 2 µm or less.

6. The method of claim 3, wherein:
    when forming the contour line in the first transparent workpiece, the pulsed laser beam comprises a first pulse energy; and
    when ablating the resin layer, the pulsed laser beam comprises a second pulse energy that is greater than the first pulse energy.

7. The method of claim 1, wherein the pulsed laser beam focal line comprises a first pulsed laser beam focal line and separating the first transparent workpiece comprises:
    focusing the pulsed laser beam output by the beam source into a second pulsed laser beam focal line oriented along the beam pathway and directed into the first transparent workpiece at a location along or near the contour line; and
    translating the laminate workpiece stack and the second pulsed laser beam focal line relative to each other along or near the contour line, thereby separating the first transparent workpiece along the first workpiece separation line.

8. The method of claim 7, wherein the second pulsed laser beam focal line comprises a greater pulse energy than the first pulsed laser beam focal line.

9. The method of claim 1, wherein separating the first transparent workpiece comprises:
    positioning the laminate workpiece stack such that the first transparent workpiece is located upstream the second transparent workpiece along the beam pathway;
    directing an infrared laser beam onto the first transparent workpiece along or near the contour line; and
    translating the first transparent workpiece and the infrared laser beam relative to each other along or near the contour line, thereby separating the first transparent workpiece along the first workpiece separation line.

10. The method of claim 1, wherein the first transparent workpiece comprises a strengthened glass substrate such that laser forming the contour line along the first workpiece separation line induces crack propagation along the contour line to separate the first transparent workpiece along the first workpiece separation line.

11. The method of claim 10, further comprising positioning the laminate workpiece stack such that the first transparent workpiece is located downstream the second transparent workpiece along the beam pathway prior to both separating the first transparent workpiece along the first workpiece separation line and separating the resin layer along the resin separation line.

12. The method of claim 1, the method further comprising:
    forming a second contour line in the second transparent workpiece of the laminate workpiece stack along a second workpiece separation line, wherein forming the second contour line comprises:
        focusing the pulsed laser beam into the pulsed laser beam focal line oriented along the beam pathway directed into the second transparent workpiece, the pulsed laser beam focal line generating induced absorption within the second transparent workpiece; and
        translating the laminate workpiece stack and the pulsed laser beam focal line relative to each other along the second workpiece separation line, thereby forming the second contour line comprising a plurality of defects along the second workpiece separation line.

13. The method of claim 11, the method further comprising separating the second transparent workpiece along the second workpiece separation line.

14. The method of claim 13, wherein the pulsed laser beam focal line comprises a first pulsed laser beam focal line and separating the second transparent workpiece comprises:
    focusing the pulsed laser beam output by the beam source into a second pulsed laser beam focal line oriented along the beam pathway and directed into the second transparent workpiece at a location along or near the second contour line of the second transparent workpiece; and translating the second transparent workpiece and the second pulsed laser beam focal line relative to each other along or near the second contour line, thereby separating the second transparent workpiece along the second contour line.

15. The method of claim 14, wherein the second pulsed laser beam focal line comprises a greater pulse energy than the first pulsed laser beam focal line.

16. The method of claim 13, wherein separating the second transparent workpiece comprises:
positioning the laminate workpiece stack such that the second transparent workpiece is located upstream the first transparent workpiece along the beam pathway;
directing an infrared laser beam onto the second transparent workpiece along or near the second contour line of the second transparent workpiece; and
translating the second transparent workpiece and the infrared laser beam relative to each other along or near the second contour line of the second transparent workpiece, thereby separating the second transparent workpiece along the second workpiece separation line.

17. The method of claim 12, wherein the second transparent workpiece comprises a strengthened glass substrate such that laser forming the second contour line along the second workpiece separation line induces crack propagation along the second contour line of the second transparent workpiece to separate the second transparent workpiece along the second workpiece separation line.

18. The method of claim 1, wherein the beam source produces pulse bursts with a burst repetition rate from about 1 pulses per pulse burst to about 30 pulses per pulse burst and a pulse burst energy of from about 25 µJ to about 1000 µJ per pulse burst.

19. The method of claim 1, wherein a spacing between adjacent defects formed in the first transparent workpiece is from about 1 µm to about 30 µm.

20. The method of claim 1, wherein:
an outward facing surface of the first transparent workpiece is arcuate;
the pulsed laser beam propagates from a pivotable laser output head; and
the pivotable laser output head pivots the pulsed laser beam focal line as the laminate workpiece stack is translated relative to the pulsed laser beam focal line, such that the pulsed laser beam retains orthogonality with an impingement location of the outward facing surface of the first transparent workpiece.

21. The method of claim 1, wherein the pulsed laser beam propagates from a pivotable laser output head coupled to a translation arm of a workpiece manufacturing assembly.

22. The method of claim 21, wherein the pivotable laser output head is pivotably coupled to the translation arm of the workpiece manufacturing assembly by a pivot joint.

23. The method of claim 21, wherein a pivotable optical component is housed within the pivotable laser output head.

24. The method of claim 1, wherein the pulsed laser beam is focused into the pulsed laser beam focal line using an optical assembly comprising a focusing lens and an axicon, each positioned within the beam pathway between the beam source and the laminate workpiece stack.

25. The method of claim 1, wherein the laminate workpiece stack comprises a vehicle glass laminate.

26. A method of laser processing a laminate workpiece stack, the method comprising:
laminating a resin layer between a first transparent workpiece and a second transparent workpiece to form a laminate workpiece stack, wherein the first transparent workpiece comprises a strengthened glass substrate;
positioning the laminate workpiece stack such that the first transparent workpiece is located downstream the second transparent workpiece along a beam pathway;
forming a contour line in the first transparent workpiece along a first workpiece separation line, wherein forming the contour line comprises:
focusing a pulsed laser beam output by a beam source into a pulsed laser beam focal line oriented along the beam pathway and directed into the first transparent workpiece, the pulsed laser beam focal line generating an induced absorption within the first transparent workpiece, the induced absorption producing a defect along the pulsed laser beam focal line within the first transparent workpiece; and
translating the laminate workpiece stack and the beam pathway relative to each other along the first workpiece separation line, thereby laser forming the contour line comprising a plurality of defects along the first workpiece separation line and inducing crack propagation along the contour line to separate the first transparent workpiece along the first workpiece separation line;
separating the resin layer along a resin separation line, wherein separating the resin layer comprises:
focusing the pulsed laser beam focal line oriented along the beam pathway into the resin layer of the laminate workpiece stack; and
translating the laminate workpiece stack and the pulsed laser beam focal line relative to each other along the resin separation line, thereby ablating the resin layer along the resin separation line.

27. The method of claim 26, wherein the method further comprises:
forming a second contour line in the second transparent workpiece of the laminate workpiece stack along a second workpiece separation line, wherein forming the second contour line comprises:
focusing the pulsed laser beam into the pulsed laser beam focal line oriented along the beam pathway directed into the second transparent workpiece, the pulsed laser beam focal line generating induced absorption within the second transparent workpiece; and
translating the laminate workpiece stack and the pulsed laser beam focal line relative to each other along the second contour line, thereby forming the second contour line comprising a plurality of defects along the second workpiece separation line.

28. The method of claim 26, wherein laminating the resin layer between the first transparent workpiece and the second transparent workpiece comprises:
disposing the resin layer between the first transparent workpiece and the second transparent workpiece;
vacuum processing the resin layer, the first transparent workpiece, and the second transparent workpiece at a pressure below atmospheric pressure; and
heating the resin layer, the first transparent workpiece and the second transparent workpiece at a pressure above atmospheric pressure.

29. The method of claim 26, wherein the laminate workpiece stack comprises a vehicle glass laminate.

30. A method for laser processing a laminate workpiece stack, the method comprising:
laminating a resin layer between a first transparent workpiece and a second transparent workpiece to form a laminate workpiece stack, wherein the first transparent workpiece and the second transparent workpiece are each arcuate;

forming a contour line in the first transparent workpiece along a first workpiece separation line, wherein forming the contour line comprises:

focusing a pulsed laser beam propagating from a pivotable laser output head into a pulsed laser beam focal line oriented along a beam pathway and directed into the first transparent workpiece, the pulsed laser beam focal line generating an induced absorption within the first transparent workpiece; and translating the laminate workpiece stack and the pulsed laser beam focal line relative to each other along the first workpiece separation line, thereby laser forming the contour line comprising a plurality of defects along the first workpiece separation line;

wherein the pivotable laser output head pivots the pulsed laser beam focal line as the laminate workpiece stack is translated relative to the pulsed laser beam focal line, such that the pulsed laser beam retains orthogonality with an impingement location of an outward facing surface of the first transparent workpiece; and separating the resin layer along a resin separation line, wherein separating the resin layer comprises:

focusing the pulsed laser beam into the pulsed laser beam focal line oriented along the beam pathway and directed into the resin layer; and translating the laminate workpiece stack and the pulsed laser beam focal line relative to each other along the resin separation line, thereby laser ablating the resin layer along the resin separation line.

31. The method of claim 30, wherein the resin layer comprises polyvinyl butyral, ethylene-vinyl acetate, or a combination thereof.

32. The method of claim 30, wherein laminating the resin layer between the first transparent workpiece and the second transparent workpiece comprises:

disposing the resin layer between the first transparent workpiece and the second transparent workpiece;

vacuum processing the resin layer, the first transparent workpiece, and the second transparent workpiece at a pressure below atmospheric pressure; and heating the resin layer, the first transparent workpiece and the second transparent workpiece at a pressure above atmospheric pressure.

33. The method of claim 30, wherein the pivotable laser output head is pivotably coupled to a translation arm of a workpiece manufacturing assembly by a pivot joint.

34. The method of claim 30, wherein a pivotable optical component IS housed within the pivotable laser output head.

35. The method of claim 30, the method further comprising separating the first transparent workpiece along the first workpiece separation line, wherein separating the first transparent workpiece comprises:

positioning the laminate workpiece stack such that the first transparent workpiece is located upstream the second transparent workpiece along the beam pathway;

directing an infrared laser beam onto the first transparent workpiece along or near the contour line; and translating the first transparent workpiece and the infrared laser beam relative to each other along or near the contour line, thereby separating the first transparent workpiece along the first workpiece separation line.

36. The method of claim 30, wherein the first transparent workpiece comprises a strengthened glass substrate such that laser forming the contour line along the first workpiece separation line induces crack propagation along the contour line to separate the first transparent workpiece along the first workpiece separation line.

* * * * *

UNITED STATES PATENT AND TRADEMARK OFFICE
CERTIFICATE OF CORRECTION

PATENT NO. : 10,752,534 B2
APPLICATION NO. : 15/795870
DATED : August 25, 2020
INVENTOR(S) : Albert Roth Nieber et al.

It is certified that error appears in the above-identified patent and that said Letters Patent is hereby corrected as shown below:

On the Title Page

Page 5, in Column 1, item [56], Line 4, delete "-achitecture," and insert -- -architecture, --, therefor.

Page 5, in Column 1, item [56], Line 38, delete "Egineering" and insert -- Engineering --, therefor.

Page 5, in Column 2, item [56], Line 34, delete "Proccessing" and insert -- Processing --, therefor.

Page 6, in Column 2, item [56], Line 25, delete "Muse" and insert -- Pulse --, therefor.

Page 6, in Column 2, item [56], Line 25, delete "ps" and insert -- 3 ps --, therefor.

In the Claims

Column 28, Line 56, Claim 13, delete "claim 11" and insert -- claim 12 --, therefor.

Column 32, Line 16, Claim 34, delete "IS" and insert -- is --, therefor.

Signed and Sealed this
Twenty-ninth Day of November, 2022

Katherine Kelly Vidal
*Director of the United States Patent and Trademark Office*